United States Patent
Rogers et al.

(10) Patent No.: US 11,520,469 B2
(45) Date of Patent: Dec. 6, 2022

(54) INTERFACE FOR MULTIPLE SIMULTANEOUS INTERACTIVE VIEWS

(71) Applicant: GOOGLE LLC, Mountain View, CA (US)

(72) Inventors: Alan Lee Rogers, Tokyo (JP); Ricardo Escutia, Tokyo (JP); Sun Kyung Park, Sunnyvale, CA (US); Michael Oh, Sunnyvale, CA (US); Renwei Wu, Tokyo (JP); Min-sang Choi, Tokyo (JP); Stephen Joseph McDonald, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/709,210

(22) Filed: Dec. 10, 2019

(65) Prior Publication Data

US 2020/0348824 A1 Nov. 5, 2020

Related U.S. Application Data

(63) Continuation of application No. PCT/US2019/034594, filed on May 30, 2019.
(Continued)

(51) Int. Cl.
*G06F 3/04845* (2022.01)
*G06F 3/04817* (2022.01)
(Continued)

(52) U.S. Cl.
CPC ........ *G06F 3/04845* (2013.01); *G06F 3/0482* (2013.01); *G06F 3/0488* (2013.01); *G06F 3/04817* (2013.01); *H04M 1/72445* (2021.01)

(58) Field of Classification Search
CPC ............. G06F 3/04845; G06F 3/04817; G06F 3/0482; G06F 3/0488; H04M 1/72561
See application file for complete search history.

(56) References Cited

U.S. PATENT DOCUMENTS

| 8,250,228 B1 | 8/2012 | Johansson |
| 8,713,473 B2 | 4/2014 | Shah et al. |
| (Continued) | | |

FOREIGN PATENT DOCUMENTS

| EP | 3255537 A1 | 12/2017 |
| WO | 2013085752 A1 | 6/2013 |
| WO | 2015067050 A1 | 5/2015 |

OTHER PUBLICATIONS

Invitation to Pay Additional Fees and Partial International Search for Application No. PCT/US2019/034594, mailed on Mar. 27, 2020, 17 pages.
(Continued)

*Primary Examiner* — Mandrita Brahmachari
(74) *Attorney, Agent, or Firm* — Brake Hughes Bellermann LLP

(57) ABSTRACT

Systems and methods are provided for displaying and interacting with multiple open views in a mobile environment. An example method can include displaying a current pane in a maximized state and at least a first pane in a minimized state in a dock area. The current pane is a top of a stack list and displays content associated with a first location and the first pane is in a dock list and displays content associated with a second location. The minimized state for a pane is a scaled down version of the maximized state for the pane, the scale applying to the content for the pane and a size of the pane. The method also includes receiving a drag input on the first pane in the dock area and scaling the size of the first pane according to proximity to the dock area.

28 Claims, 23 Drawing Sheets

Related U.S. Application Data

(60) Provisional application No. 62/841,771, filed on May 1, 2019.

(51) Int. Cl.
    *G06F 3/0488*     (2022.01)
    *G06F 3/0482*     (2013.01)
    *H04M 1/72445*     (2021.01)

(56) References Cited

U.S. PATENT DOCUMENTS

| | | | |
|---|---|---|---|
| 10,216,388 B2 | 2/2019 | Weber et al. | |
| 10,423,303 B1 | 9/2019 | Roach et al. | |
| 10,514,839 B2 | 12/2019 | Tamura | |
| 10,564,845 B2 * | 2/2020 | Kwon | G06F 3/0488 |
| 2007/0198948 A1 * | 8/2007 | Toriyama | A63F 13/005 |
| | | | 715/790 |
| 2008/0168402 A1 | 7/2008 | Blumenberg | |
| 2010/0192101 A1 * | 7/2010 | Chmielewski | G06F 3/0482 |
| | | | 715/834 |
| 2011/0167376 A1 * | 7/2011 | Sauve | G06F 3/0481 |
| | | | 715/777 |
| 2011/0202848 A1 * | 8/2011 | Ismalon | G06F 16/958 |
| | | | 715/738 |
| 2012/0054667 A1 | 3/2012 | Beykpour et al. | |
| 2012/0081292 A1 | 4/2012 | Sirpal et al. | |
| 2012/0086722 A1 | 4/2012 | Miyazawa et al. | |
| 2012/0131519 A1 | 5/2012 | Jitkoff | |
| 2012/0278756 A1 * | 11/2012 | Shah | H04M 1/72561 |
| | | | 715/790 |
| 2013/0019182 A1 * | 1/2013 | Gil | G06F 3/0482 |
| | | | 715/738 |
| 2013/0047104 A1 | 2/2013 | Chen | |
| 2013/0067377 A1 * | 3/2013 | Rogers | G06F 3/0482 |
| | | | 715/769 |
| 2013/0145291 A1 * | 6/2013 | Weber | G06F 3/0483 |
| | | | 715/760 |
| 2013/0227419 A1 | 8/2013 | Lee et al. | |
| 2014/0082483 A1 * | 3/2014 | Yang | G06F 16/9574 |
| | | | 715/234 |
| 2014/0101535 A1 * | 4/2014 | Kim | G06F 3/1431 |
| | | | 715/234 |
| 2014/0279245 A1 | 9/2014 | Callanta et al. | |
| 2014/0298253 A1 | 10/2014 | Jin et al. | |
| 2014/0298267 A1 * | 10/2014 | Chan | G06F 3/0481 |
| | | | 715/841 |
| 2015/0149965 A1 * | 5/2015 | Bakhash | G06F 3/04817 |
| | | | 715/836 |
| 2015/0177933 A1 | 6/2015 | Cueto | |
| 2015/0370425 A1 | 12/2015 | Chen et al. | |
| 2016/0217143 A1 * | 7/2016 | Cao | G06F 3/04855 |
| 2016/0291848 A1 * | 10/2016 | Hall | G06F 3/04883 |
| 2016/0357358 A1 | 12/2016 | Forster et al. | |
| 2017/0060349 A1 * | 3/2017 | Munoz | G06F 3/0482 |
| 2017/0357437 A1 * | 12/2017 | Peterson | G06F 3/0486 |
| 2018/0335921 A1 | 11/2018 | Karunamuni et al. | |
| 2018/0335939 A1 | 11/2018 | Karunamuni et al. | |
| 2019/0339855 A1 * | 11/2019 | Walkin | G06F 3/0485 |
| 2020/0348825 A1 | 11/2020 | Rogers et al. | |

OTHER PUBLICATIONS

Joshuag, "Macworld San Francisco 2000—The Mac OS X Introduction (Pt.3)", Youtube, retrieved on Feb. 24, 2020, from https://www.youtube.comwatch?v=2GkoAa5718Y, Aug. 20, 2006, 1 page.

"Google Chrome—Duplicate Tab", TipDesk, available at https://www.youtube.com/watch?v=307mQv6bvKk (YouTube), Oct. 2014, 3 pages.

Notice of Allowance for U.S. Appl. No. 16/710,769, dated Mar. 16, 2022, 13 pages.

* cited by examiner

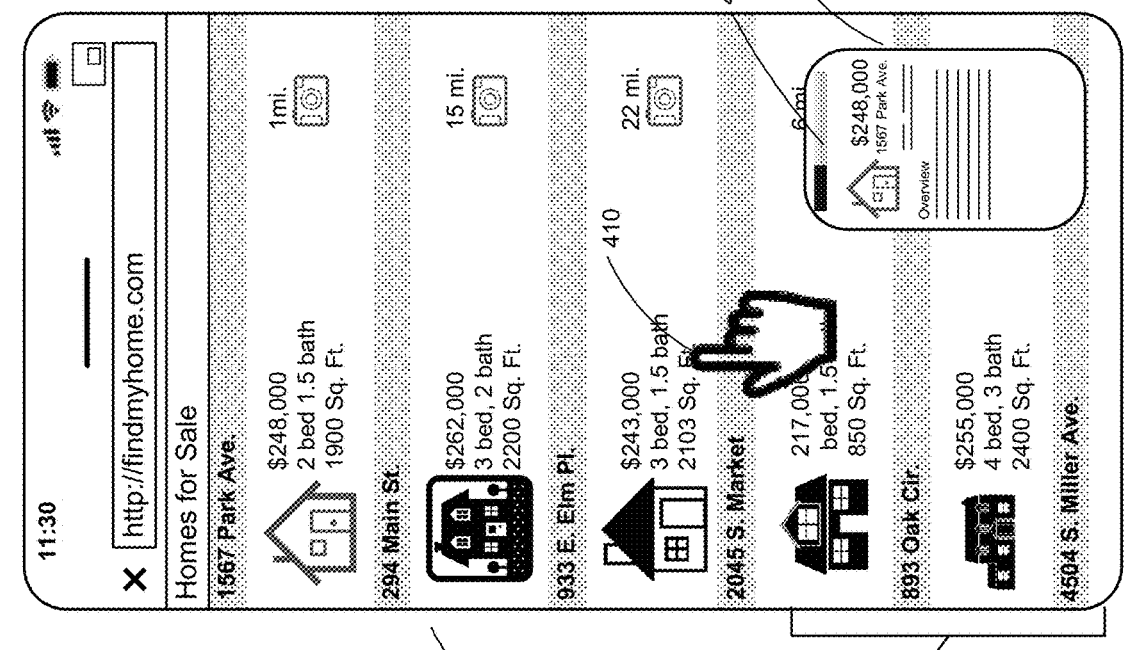
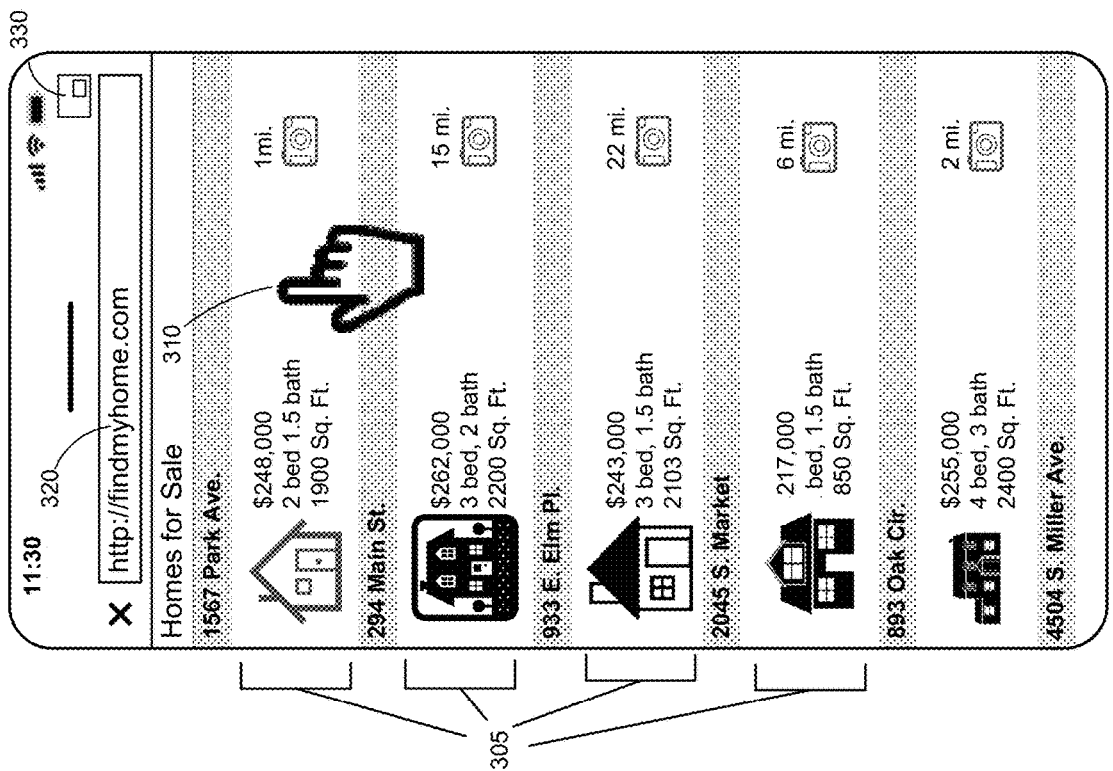

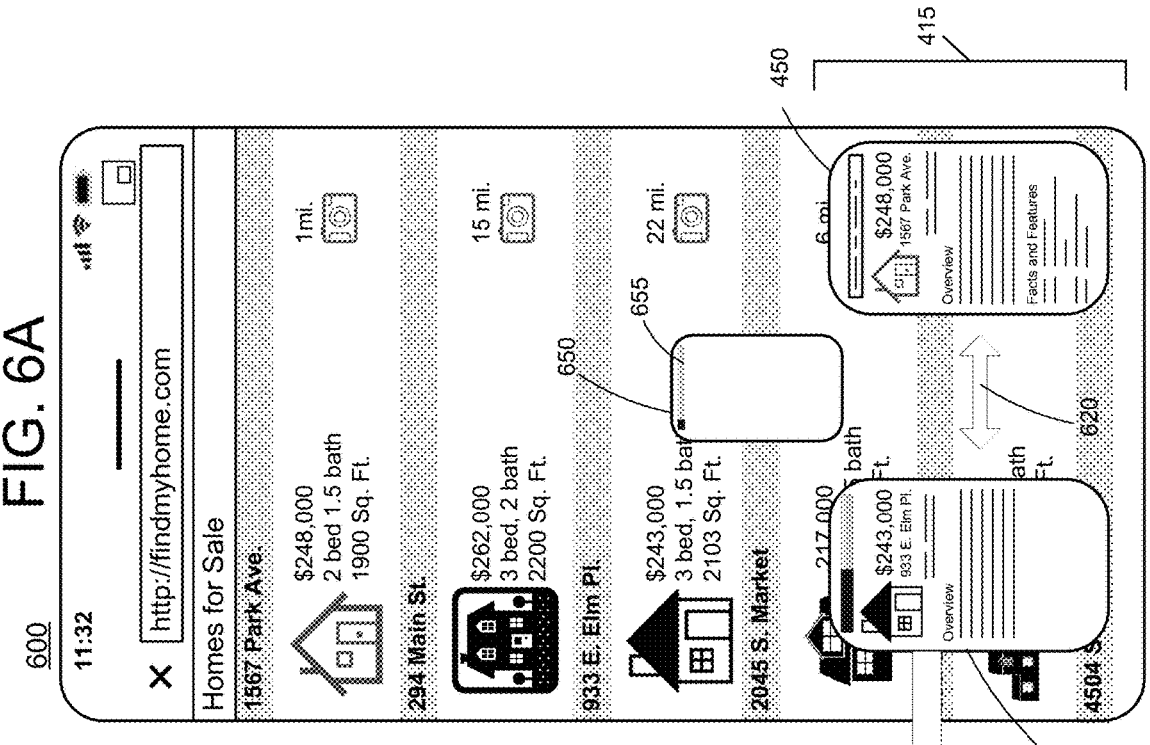
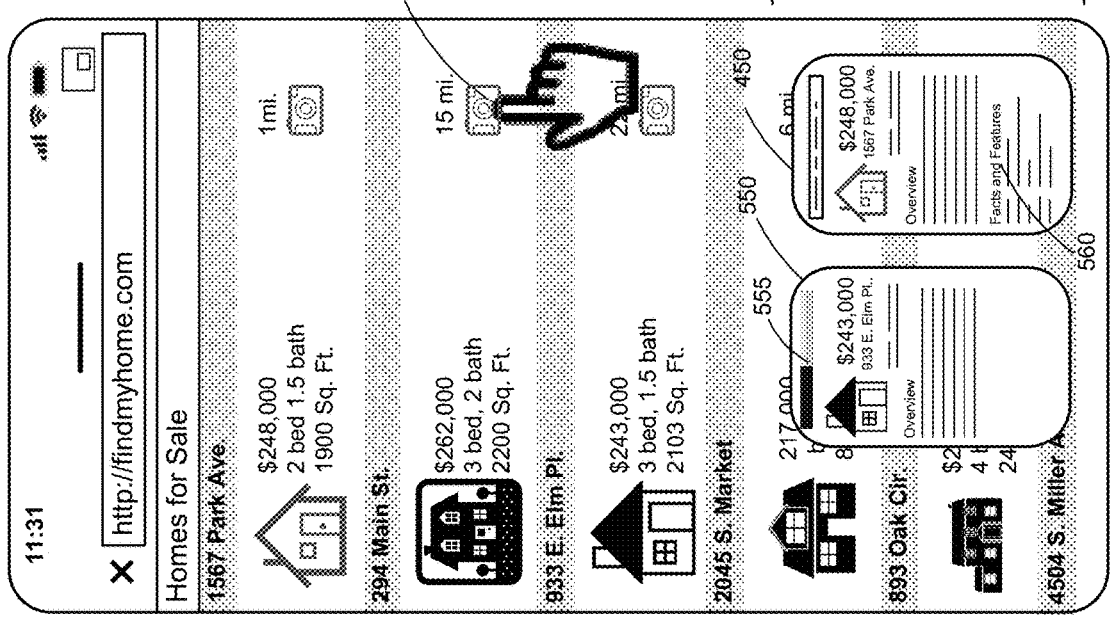

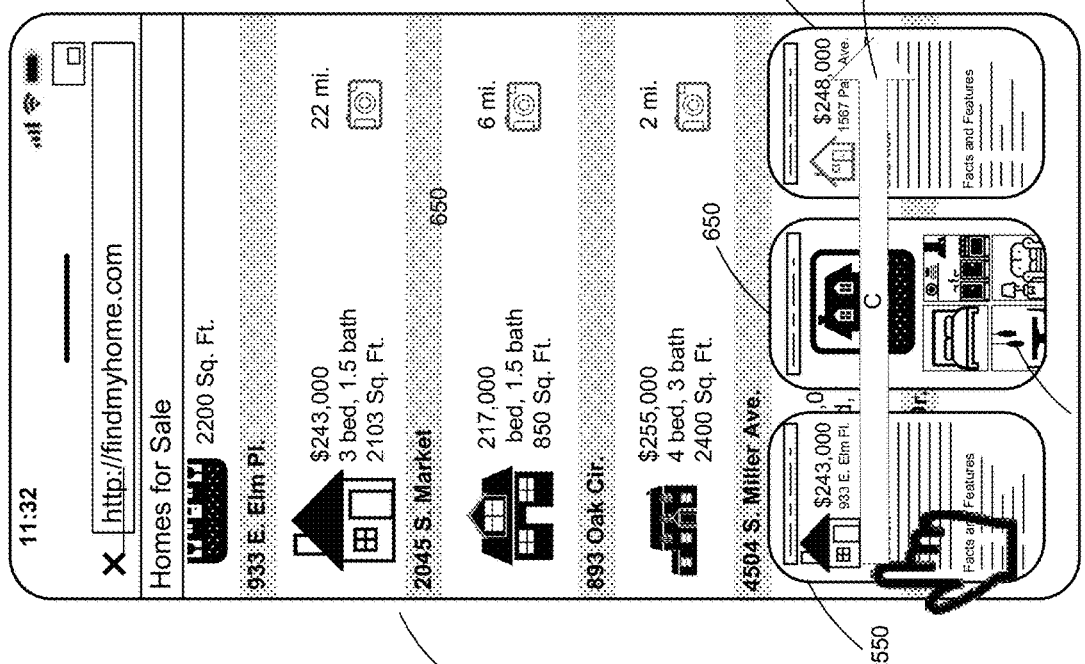
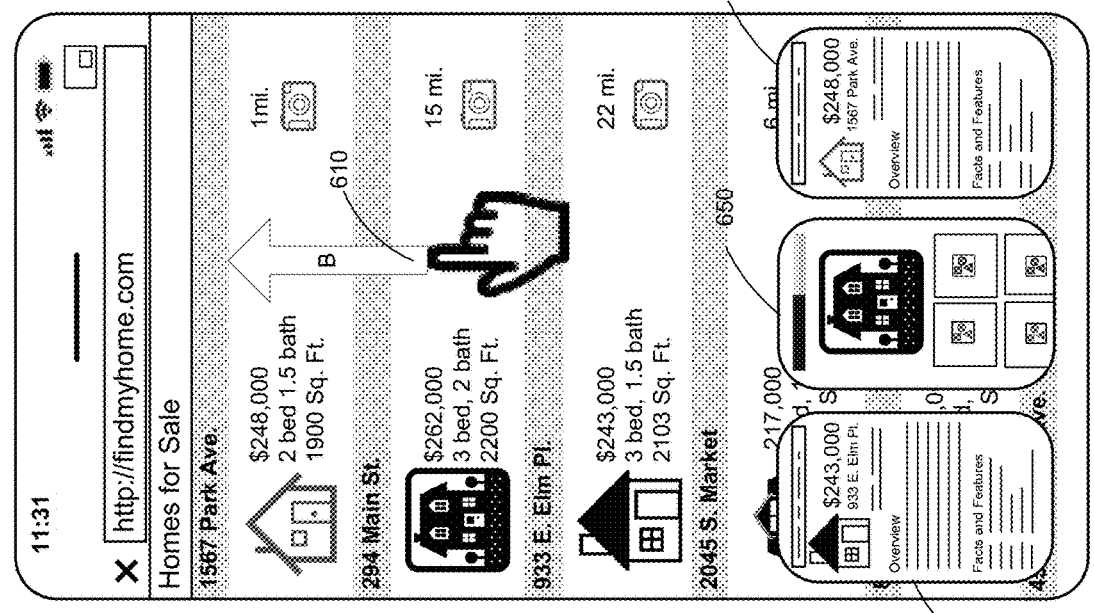

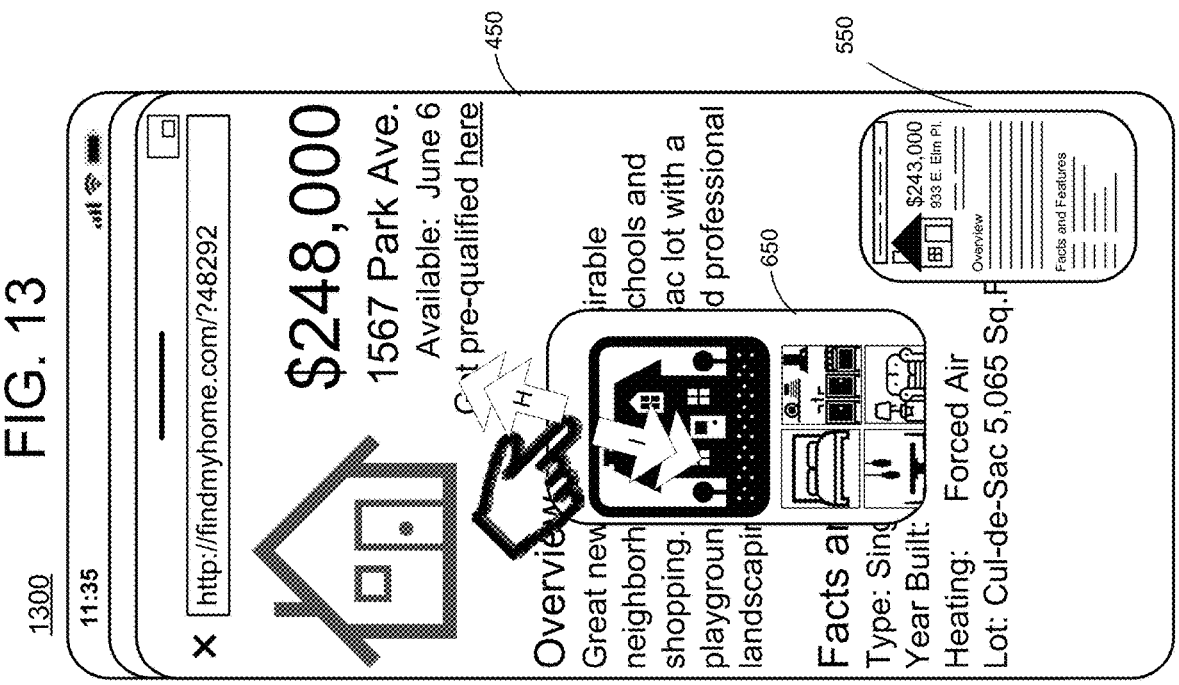
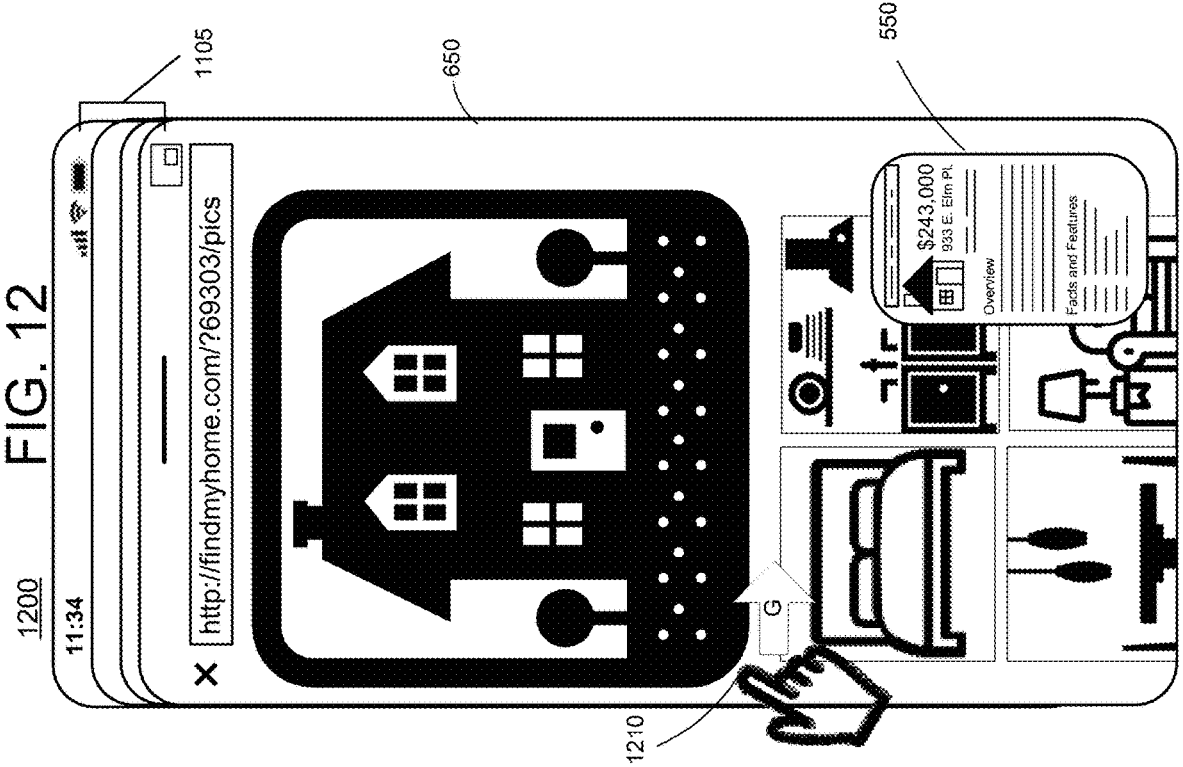

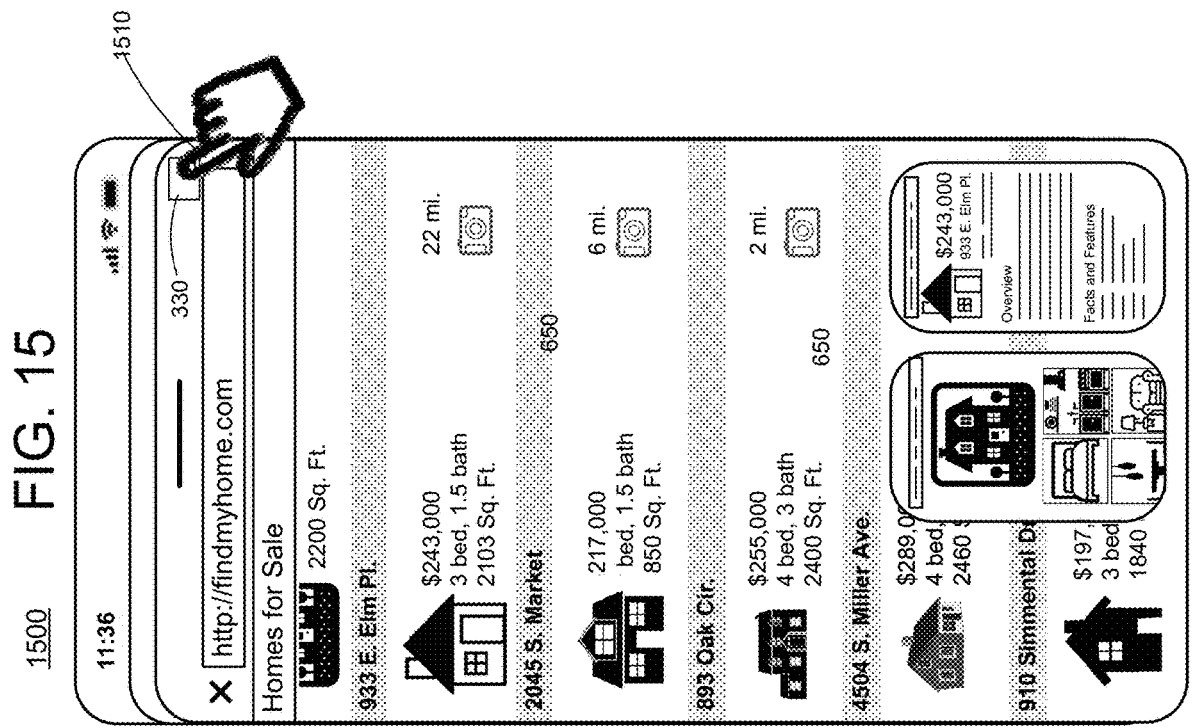
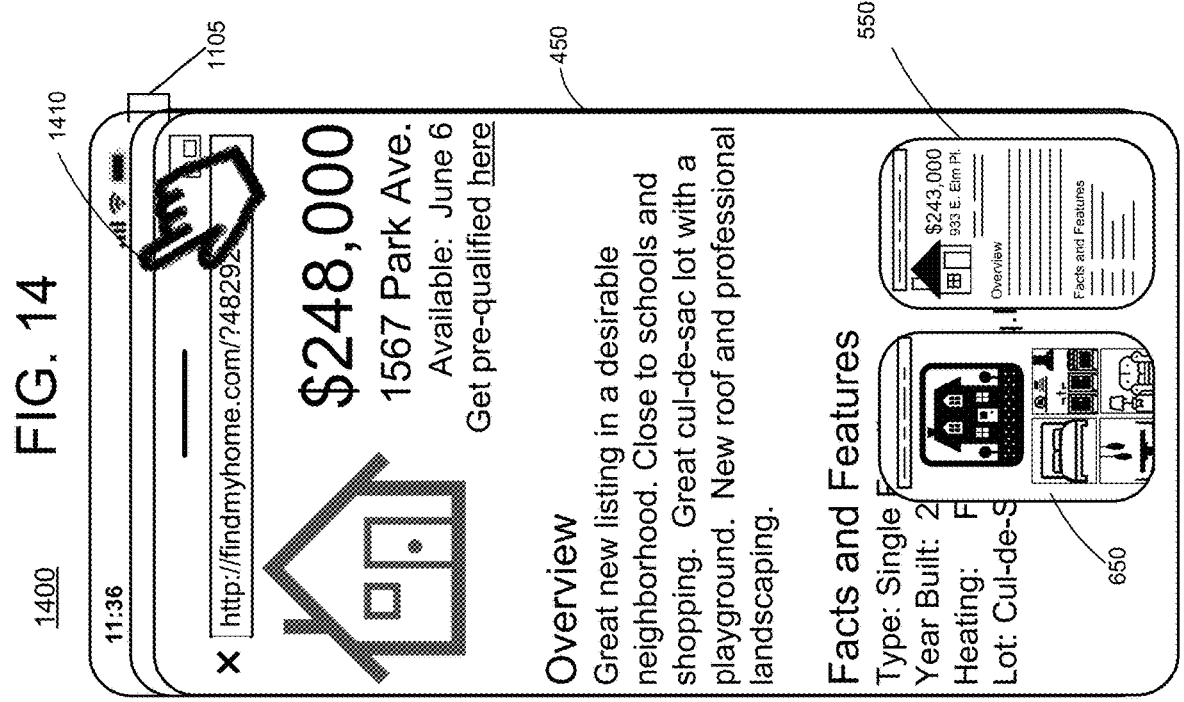

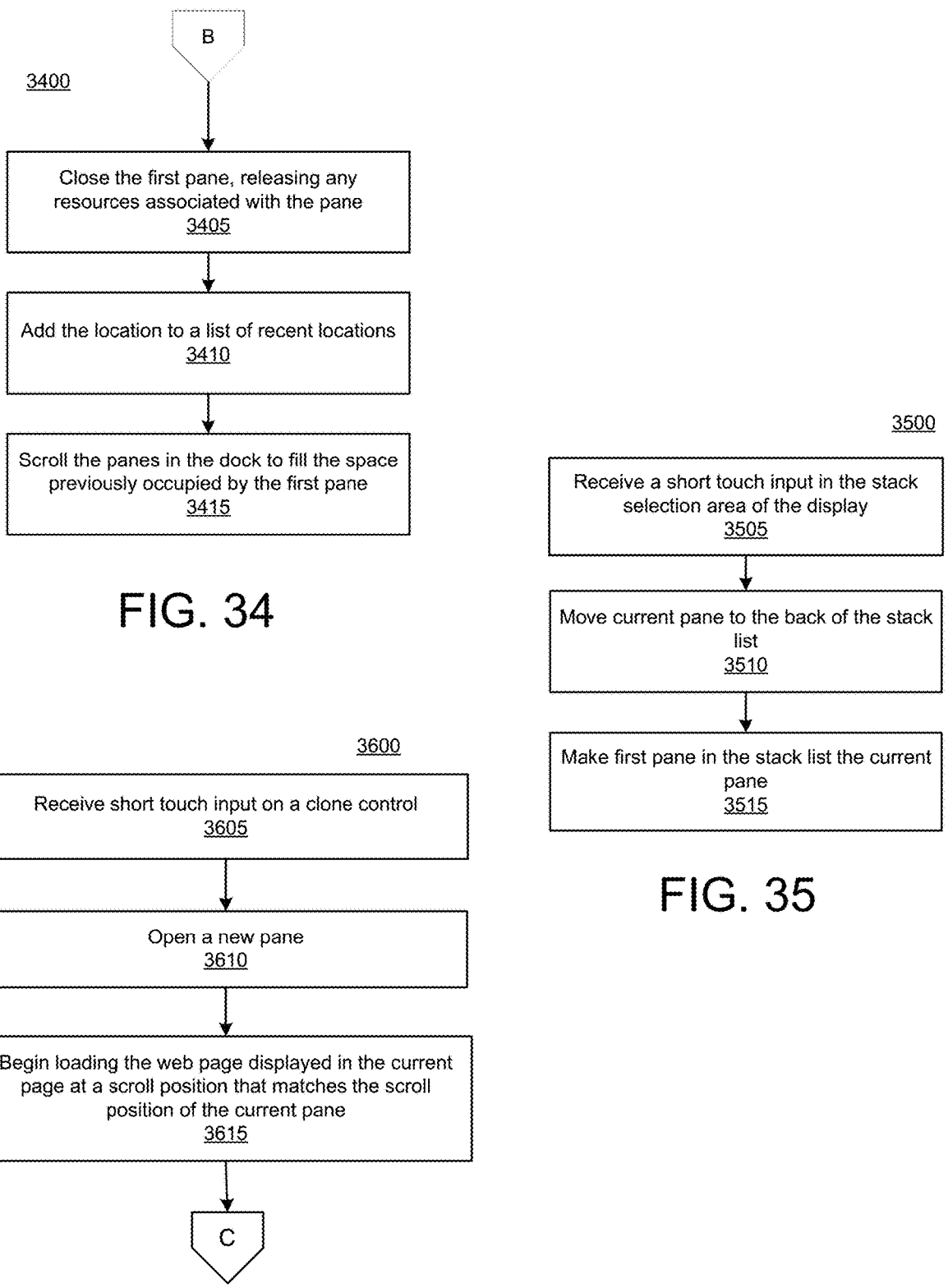

INTERFACE FOR MULTIPLE SIMULTANEOUS INTERACTIVE VIEWS

RELATED APPLICATIONS

This application is a bypass continuation of PCT Application No. PCT/US2019/034594, filed May 30, 2019. This application is also a non-provisional of, and claims the benefit of U.S. Provisional Application No. 62/841,771, filed May 1, 2019. The disclosures of these prior filed applications are incorporated herein by reference in their entireties.

BACKGROUND

As users move away from web-based browsers to using mobile devices they lose the ability to easily navigate between multiple views of data, such as webpages. Current mobile browsers, search assistant applications, and mobile applications in general only show one active page, or view, at a time and switching between active pages, if such functionality is available at all, requires invoking a switcher mode. Mobile devices are typically limited by the types of user input that can be received via a touch screen, and by the relatively small size of their screens. Thus, a mobile environment hampers the ability to compare information.

SUMMARY

Implementations provide an interface that enables a user to easily open, observe, and manage multiple active views at one time in a mobile environment. The interface manages views as scalable, draggable, panes. The panes may be either part of a stack (e.g., in a stack list) in a maximized state or part of a dock (e.g., in a dock list) in a minimized, but still viewable, state. The interface enables a user to easily move panes between the dock and stack. The interface also enables a user to temporarily increase the size of a minimized pane for quick viewing of the content. A pane being dragged may grow or shrink, as appropriate, when being moved between the dock and the stack. A pane being dragged between the dock and stack may snap to the stack or to the dock depending on where the user ends the drag input. If a user releases the drag beyond a maximization threshold, the pane will snap to the maximized state in the stack. Otherwise it will snap to the minimized state in the dock. Thus, implementations enable a user to temporarily drag a pane from a minimized state in the dock to enlarge the pane and view the content, with the pane returning to the dock when the drag is released. Thus, the user can quickly compare the content of several panes in the dock without navigating to a tab or task switching interface. The panes in the dock are scrollable, making it easy to view the various active pages. The panes in the stack can be accessed via a single input.

A pane may be opened in the dock in response to a long touch input (either a long press or 3D press, or some combination of these) of a hyperlink or similar navigation control in the content of a current pane. Only the top pane in a stack list has visible content; the content of the remaining panes is hidden by the content of the current pane. The visible top pane is considered the current pane. The web pages in the dock are still active, i.e., load/update in parallel with each other and with the current pane.

The dock may be maintained as a dock list and acts as a carousel of minimized panes that can be scrolled and tucked via user gestures. Panes can be moved around in the dock (rearranged), with other panes in the dock moving to make room as the selected pane is moved. Panes can be closed by being dragged to a footer or by selection of a close action. A close action is one type of contextual action that appears when a pane is selected via a long touch input. Contextual actions can appear in a footer or as selectable controls. Some implementations can provide toggle controls on each pane in the dock so that contextual actions may be applied to more than one pane at a time.

One or more of the implementations of the subject matter described herein can be implemented so as to realize one or more of the following advantages. As one example, implementations provide a way for a user to effortlessly compare and organize information from multiple pages with minimal input actions. Conventional applications show one page (pane) of information at a time. Opening multiple panes of content in a minimized state enables a user to more efficiently cue up content to investigate, switch between the content panes, cull panes, and compare options within the limited real estate of a mobile device's display. The ability to resize the pane during a drag enables a user to easily and temporarily view the content of a page without having to navigate away from the currently displayed content. This improves the user experience and provides users with previously unavailable simultaneous views, e.g., of active web pages, different documents, different database records, etc. Gestures for manipulating the minimized panes are easy and intuitive, improving the overall user experience with the interface. As another example, implementations promote quick and temporary comparisons of information by one-touch scrolling through panes in the stack and through the ability to temporarily enlarge a pane dragged from the dock, the pane returning to the dock when the drag input ends. As another example, implementations allow multiple active views to be displayed simultaneously, which can make better use of the limited bandwidth and computational resources available to a mobile device. Specifically, the provision of multiple active views can allow multiple items of content (e.g., web pages) to be loaded, run and/or updated in parallel. Thus, a user can interact with one active view whilst the content of one or more other active views are being downloaded; this can make better use of the available bandwidth, by allowing content to be downloaded at times when the mobile device would not be downloading content because the user is interacting with content in another view. Similarly, a user can interact with one active view whilst the content of one or more other active views are being rendered, updated or executed; this can make better use of the available computational resources, by allowing content to be processed at times when the processor of the mobile device would be underutilized because the user is interacting with content in another view. Further, by making use of otherwise underutilized communication and/or processing resources in this manner, the mobile device can display content more quickly when a user switches from one active view to another.

The details of one or more implementations are set forth in the accompanying drawings and the description below. Other features will be apparent from the description and drawings, and from the claims.

BRIEF DESCRIPTION OF DRAWINGS

FIG. 3 is an example interface generated by a mobile application using the multi-view library, in accordance with the disclosed subject matter.

FIG. 4 is an example interface resulting from a long touch input on a hyperlink in the interface of FIG. 3, in accordance with the disclosed subject matter.

FIG. 5 is an example interface resulting from a second long touch input on a second hyperlink in the interface of FIG. 4, in accordance with the disclosed subject matter.

FIG. 6A illustrates an example interface of a pane opening into the dock area of a display resulting from a long touch input on a third hyperlink in the interface of FIG. 5, in accordance with disclosed implementations.

FIG. 6B illustrates the interface of FIG. 6A after the pane is finished opening into the dock area.

FIG. 7 illustrates an example interface generated from a scroll input performed on the interface of FIG. 6B, in accordance with some implementations.

FIG. 12 illustrates an example interface generated from throwing a pane in the dock portion of the interface of FIG. 11 towards a header (e.g., a drag input that meets a velocity threshold), in accordance with some implementations.

FIG. 13 illustrates an example interface generated from a back input performed on the current pane of the interface of FIG. 12 that meets a resistance threshold, in accordance with some implementations.

FIG. 14 illustrates an example interface illustrating a possible result of the drag input illustrated in the interface of FIG. 13, in accordance with some implementations.

FIG. 15 illustrates an example interface generated by a short touch input on the stack selection area of the interface of FIG. 14, in accordance with some implementations.

FIG. 34 illustrates a flow diagram of an example process for closing a pane in the dock, in accordance with disclosed implementations.

FIG. 35 illustrates a flow diagram of an example process for switching the current pane displayed in a multi-view environment, in accordance with disclosed implementations.

FIG. 36 illustrates a flow diagram of an example process for cloning a current pane in a multi-view environment, in accordance with disclosed implementations.

Like reference symbols in the various drawings indicate like elements.

DETAILED DESCRIPTION

Figure 1:
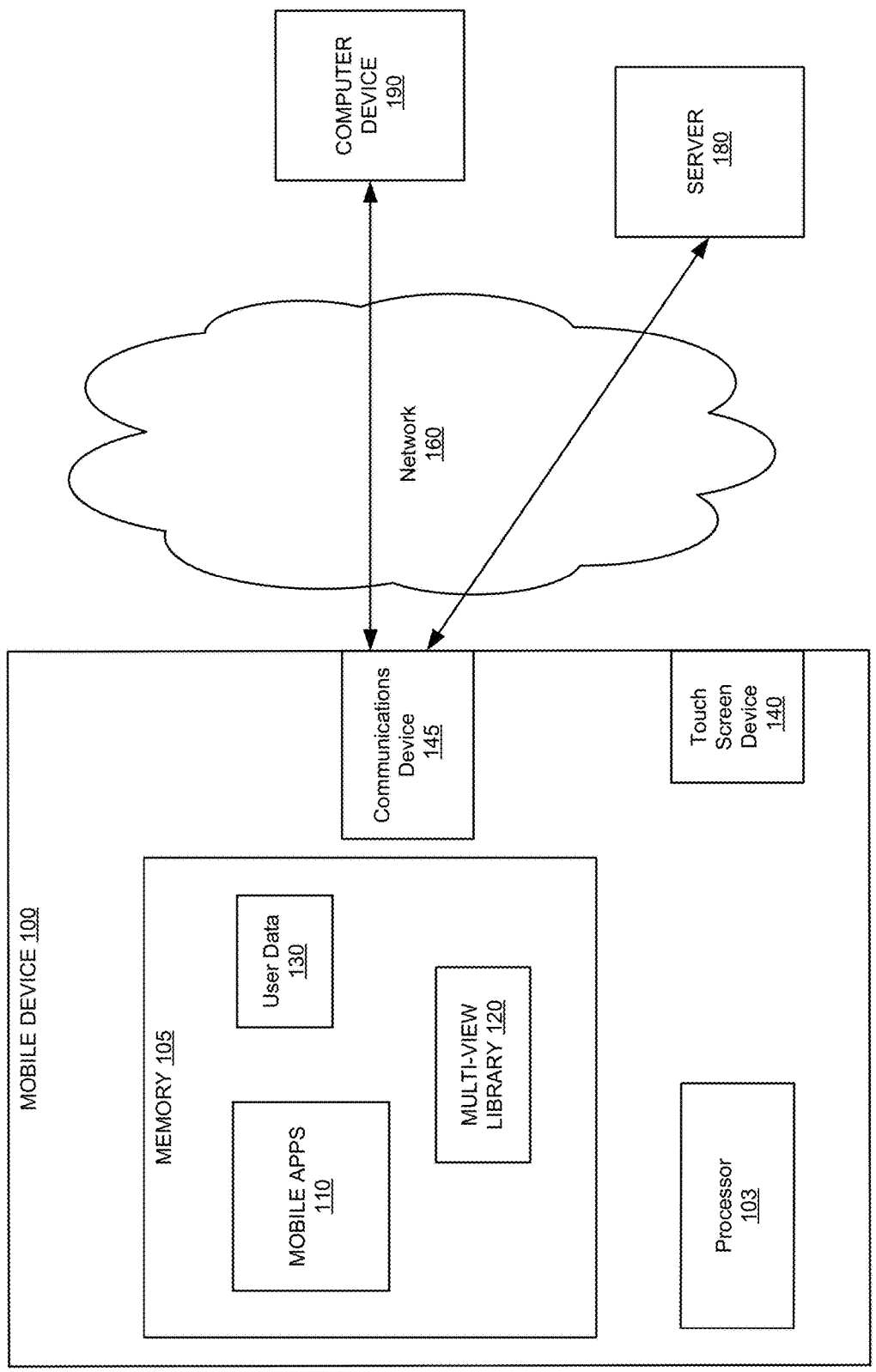
FIG. 1 is a block diagram illustrating an example system in accordance with the disclosed subject matter.

Implementations include systems and methods for displaying and managing multiple active views of data in a mobile environment. Implementations enable a user of a mobile device to open, organize, and compare information from several different views with minimal gestures from the user and without navigating away from the current view. A view can be for any organization of related data for presentation to a user, such as a web page, a database record or records, a document, an image, etc. The view may be an active view. An active view differs from a static thumbnail of the underlying content because it can display dynamic content, e.g., continues to load/run/update even in the minimized state. Implementations enable multiple views to load/update concurrently, subject to CPU and memory constraints. As used herein, a view is also referred to as content, or in other words how the source of the data organizes and presents the underlying related data to a user. A mobile application generates the views.

A view may be opened in a pane. A pane is a user interface element that displays, and is associated with, a view. In other words, a pane is container for displaying content. A pane may be selectable by the user. For example, a pane may be the subject of a long touch input, a drag input, a scroll input, etc. A pane is resizable. The content of a pane scales to match the size of a pane. In other words, when a pane is resized, the content is also resized at the same scale. A pane may be associated with a location for the content, e.g., a URL for a web page, a primary key for a database record, deep link or query for a user interface state, a path and file name for a document or image, etc. A pane may have an associated back stack. A back stack is a history of content (views) visited via links or similar navigation controls. For example, when a user taps on a hyperlink, a browser conventionally opens the web page that is the target of the hyperlink. The previous web page, which displayed the hyperlink that was selected, is added to the back stack and the browser displays the content of the target page. The back stack enables a user to retrace navigation steps via a "back" button or similar gesture/action. The activation of the back button or gesture is referred to as a back input. When a pane is opened the back stack for the pane is empty. The content displayed when a pane is opened can be referred to as the top of the back stack.

A short touch input refers to a tap, right-click of a mouse button, etc. that conventionally activates a navigation control. As used herein a touch can be any input provided by an object that makes contact with and is recognized by a touch-screen, as well as other similar inputs used to activate a hyperlink, such as clicking a mouse button, a visual selection (e.g., gazing at a navigation control for some predetermined time), etc.

A long touch input is another input gesture used by disclosed implementations. A long touch input can be a touch with a duration that meets a predetermined threshold. Thus, for example, the difference between a long touch input and a short touch input can be the duration of the touch. A long touch input can be a 3D input independent of any duration. Some mobile devices can determine not only the duration of a touch, but also how much pressure is applied. A long touch may thus be defined as a 3D input having a pressure that meets a predetermined threshold. In some implementations a 3D input can be of any duration so long as the pressure meets a predetermined threshold. As used herein, a long touch input can be of a touch of at least a predetermined duration, a touch input of at least a particular pressure, or a touch of some combination of duration and pressure. Some implementations may use other criteria for a long touch input, such as a touch that includes multiple digits (e.g., two fingers), length of a gaze on the navigation control, etc. A short touch input is a touch input that fails to meet the criteria of a long touch input. Implementations use a long touch input to open new panes. For example, responsive to a long touch input on a hyperlink, implementations open the target of the hyperlink in a new pane, rather than in the current pane. Responsive to a short touch input on a hyperlink, implementations open the target of the hyperlink in the current pane and add the previously displayed web page to the back stack for the current pane.

Implementations may organize panes into a stack and a dock. A stack is a group or list of panes in a maximized state. A maximized state represents a largest size of the pane within the mobile application. Conventionally, in a mobile environment the largest size is close to the size of the display device. The maximized state may allow for display of a header area. The maximized state may allow for display of a footer area. A header is often located at the top of the display and a footer at a bottom of the user interface. However, implementations include headers at the left of the user interface and footers at the right of the user interface. Implementations also include headers at the right of the user interface and footers at the left of the user interface. The mobile application that uses the multi-view library may determine placement of the header and footer. A footer is understood to be at an opposite side of the user interface from the header, even if a particular implementation does not display a separate footer.

Because panes in the stack are in a maximized state, only the content of one pane in the stack list can be displayed at a time. In other words, panes in the maximized state are stacked on top of each other so that the content of the current pane hides the content of the remaining panes in the stack. The pane that has its content currently displayed is referred to as the current pane. The current pane is also referred to as the top of the stack. When a pane is removed from the stack, e.g., dragged from the stack, sent to the dock, or closed, the next pane in the stack list becomes the current pane. In some implementations, a user can rotate through the panes in the stack via a short touch input. For example, the user may change the current pane by providing a short touch input on a stack selection area. In some implementations, the stack selection area may provide an indication of the number of panes in the stack or an indication that the stack includes more panes than just the current pane. Panes in the stack may also be referred to as being in a stack list, but implementations cover various structures for determining which panes are in the stack, such as a linked list, an array, checking a state attribute for a pane, etc.

A dock list is a group or list of panes in a minimized state. As used herein, a minimized state represents a smaller version of a maximized state. The content of a pane in a minimized state is still visible, or in other words, not removed from display or replaced with an icon. Instead, a pane in a minimized state still displays the content that was displayed in the maximized state, but the pane and the content are reduced in size, i.e., scaled down, so that the content fits in the resized pane. Thus, while the content of a pane in the minimized state is visible it may or may not be legible due to smaller size. In other words, visible content may be legible but does not need to be legible, with legibility depending on the size of the pane and the size of fonts used in the content and resolution of the display. The pane may provide active content, e.g., content that loads/updates while in the minimized state. In some implementations, the size of the pane in a minimized state may be expressed as a percentage of the size of the pane in a maximized state. For example, a minimized pane may be 20% of the size of a maximized pane. In some implementations, the size of a pane in the minimized state may be determined by the mobile application. In some implementations, the size of a pane in the minimized state may be determined by a multi-view manager. Panes in the dock may also be referred to as being in a dock list, but implementations cover various structures for determining which panes are in the dock, such as a linked list, an array, checking a state attribute for a pane, etc.

Panes in the dock are displayed in a dock area of the user interface (display). The dock area is proximate the footer. In some implementations, the dock area displays at most a predetermined quantity of panes. Thus, not all panes in the dock list may be visible, i.e., some panes may be off display. If some panes are off display, the panes in the dock area can be scrolled via a scroll input. A scroll input is a swipe in a scroll direction. The scroll direction is typically in a direction parallel to the header/footer. Thus, for example, a scroll direction is left-right when the header and footer are top/bottom. A scroll input differs from a touch input because it has a distance component, e.g., the length of the swipe, and a direction component. A scroll input can also have a velocity, e.g., representing how fast the distance is covered. Panes can be the subject of a drag input. A drag input can begins with a touch of a pane and lasts until the hold is released. Thus, a drag input ends with release of the pane. A drag input can also be referred to as a touch-and-drag. A drag input differs from a scroll input based on the direction component. A drag input has a direction component that is perpendicular to the scroll direction. A swipe or touch-and-drag may be considered a drag input unless the initial direction of the drag is generally in the scroll direction. A pane that is the subject of a drag input that has not been released is referred to as in a draggable state. A pane is resized during the draggable state (i.e., during a drag input) in accordance with its proximity to the dock area. Panes can be rearranged in the dock via a drag input. Panes in the draggable state are changed to either a minimized state in the dock or a maximized state in the stack at the conclusion of the draggable state.

FIG. 1 is a block diagram of a mobile device in accordance with an example implementation. The mobile device 100 is configured to provide a multiple interactive views that enable a user to compare, cull, and manage multiple views of data without navigating to a switcher interface. A switcher interface enables a user to select one of a plurality of views (e.g., open windows in a browser) and return to a full-content state (e.g., view of a single page), but can cause the user to lose context. The mobile device 100 provides an easier and more fluid navigation experience more conducive to quick comparisons of information. The mobile device 100 may be an example of computer device 3900, as depicted in FIG. 3900. Mobile device 100 may include one or more processors 103 formed in a substrate configured to execute one or more machine executable instructions or pieces of software, firmware, or a combination thereof. The processors 103 can be semiconductor-based—that is, the processors can include semiconductor material that can perform digital logic. The mobile device 100 can also include one or more computer memories 105. The memories 105, for example, a main memory, may be configured to store one or more pieces of data, either temporarily, permanently, semi-permanently, or a combination thereof. The memories 105 may include any type of storage device that stores information in a format that can be read and/or executed by the one or more processors 103. The memories 105 may include volatile memory, non-volatile memory, or a combination thereof, and store mobile applications, modules or engines that, when executed by the one or more processors 103, perform certain operations. In some implementations, the applications, modules, or engines, may be stored in an external storage device and loaded into the memory 105 of the mobile device 100.

The mobile applications 110 may include any number of applications configured to execute on the mobile device 100, such as an operating system, a browser, a messaging application, shopping applications, web-site equivalents, search assistants, maps, etc. The memory 105 may also store user data 130. The user data 130 may be used by one or more of the mobile applications 110 to personalize the user experience, save user settings, etc. The memory 105 may also store a multi-view library 120. The multi-view library 120 may include data, data structures, and instructions that can be used by one or more of the mobile applications 110 to enable the mobile applications 110 to provide multiple views of data. In some implementations, the library 120 may be implemented via an application programming interface (API) callable by the mobile application. In some implementations, the library 120 may be incorporated into, e.g., compiled into, the mobile application 110. In some implementations, some components/functions of the library 120 may be incorporated into the mobile application 110 and others may be accessed via the API. Thus, in some implementations, the library 120 may be included in one or more of the mobile applications 110.

The mobile device 100 may include one or more input devices, such as touch screen device 140, a microphone, a camera, one or more physical buttons, a keyboard, etc. The input devices may initiate input events, which can be analyzed by the mobile applications 110 and the multi-view library 120. The mobile device may also include communications device 145. The communications device 145 may be operable to send and receive data from other computing devices, such as another computing device 190 or one or more servers 180 over network 160. Network 160 may be for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160, the mobile device 100 may receive data, e.g., web pages, data records, documents, etc., communicate with, and transmit data to/from other computing devices 190 and the one or more servers 180. The configuration of FIG. 1 represents one example configuration and implementations may incorporate other configurations.

Figure 2:
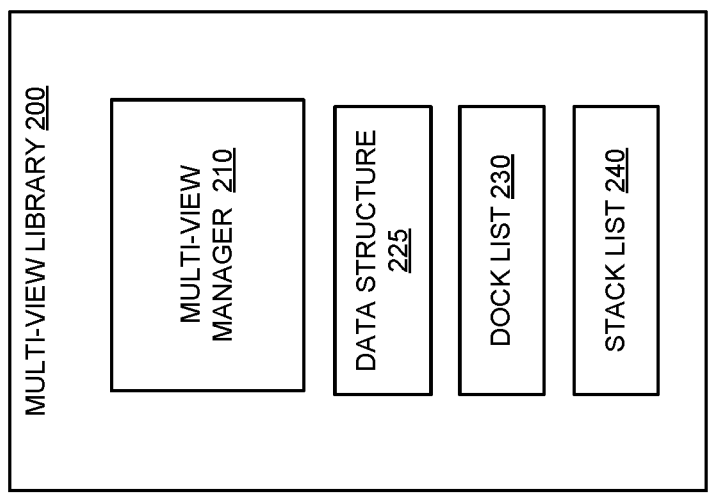
FIG. 2 is a block diagram illustrating components of an example multi-view library, in accordance with the disclosed subject matter.

FIG. 2 is a block diagram illustrating components of an example multi-view library 200, in accordance with the disclosed subject matter. The multi-view library 200 may be an example of the multi-view library 120 of FIG. 1. As indicated earlier, the library 200 may be implemented as an API, may be incorporated into a mobile application, or may have some components incorporated into the mobile application and may provide others via API calls. The multi-view library 200 generates a user interface that enables the viewing, culling, generation of, and interaction with panes. As used herein, the user interface may also be referred to as a display. Content and user interface elements (such as panes) assigned to pixels are considered visible or on display. Content and user interface elements not assigned to a pixel are considered off display or not visible.

The library 200 includes a data structure 225 for managing multiple active panes. The data structure 225 may include data elements associated with each instance of a pane. For example, the data structure 225 may include a location/source of the content being displayed in the pane. The location can be expressed as, for example, a URL, a path and filename, a primary key of a database, a query, a deep link, a user interface identifier, etc., depending on the content provider. The data structure 225 may include variables relating to properties of the pane. For example, the data structure 225 can include a state of the pane. As another example, in some implementations, the data structure 225 may include a flag indicating whether navigation forward is allowed. The data structure 225 may also include a flag indicating whether navigation back is allowed. If navigation back is allowed, the data structure 225 may include a back stack for the pane. The back stack tracks previous locations the user visited, in the order of visitation. The back stack may operate as a first-in-first-out (FIFO) queue. The back stack may be accessed via a back input. The back input may be a particular gesture defined by a mobile application or the mobile device. The back input may be a control (e.g., button) provided by the mobile device. In some implementations, the data structure 225 may include a flag indicating whether the pane remains active, e.g., after loading. In some implementations, this flag may have a default value of TRUE (active). In some implementations, the flag may be adjusted to ensure memory and/or CPU usage stay within certain limits. For example, if a user opens too many panes, one or more of the panes not currently visible (e.g., a pane in the stack but not the current pane, or a pane off display in the dock) may have the flag indicating the pane remains active set to FALSE (inactive). In some implementations, the flag may be set in response to a change in the visible status of the pane, e.g., going from off display to the dock area, etc. In some implementations, the content may be refreshed when the pane goes from being inactive to active. In some implementations, the data structure 225 may track the scroll offset from the beginning of the content. For example, when a pane allows content to be scrolled, the data structure 225 may track how far the user has scrolled in the content.

The library 200 may also include a dock list 230 and a stack list 240. The dock list 230 identifies panes currently in a minimized state, or in other works in the dock. As previously discussed, although referred to as a list for the sake of discussion, the dock list 230 may be implemented in a variety of ways, including checking the state property of a pane. Not all panes in the dock list may be in the dock area of the display as the dock area may display at most a predetermined number of panes. Accordingly, the dock list 230 may include an indication of which panes are currently displayed in the dock area. This indication can also be an attribute of the pane, e.g., in data structure 225. In some implementations, the dock list 230 may also include an indication of whether the dock is tucked or not. The stack list 240 identifies panes currently in a maximized state, or in other words in the stack. The stack list 240 may also include an indication of which pane is the current pane. In other words, the stack list 240 may include some way to identify the current pane. In some implementations, the stack list may include one pane considered the host pane. The host pane is a pane that cannot be dragged from the stack. In such implementations, the content of the host pane allows creation of other panes via long touch inputs on navigation controls (e.g., links), but itself cannot be changed to a minimized state. In such implementations, the actions described as tearing or dislodging the current pane from the stack would not apply when the current pane is the host pane.

Figure 33:
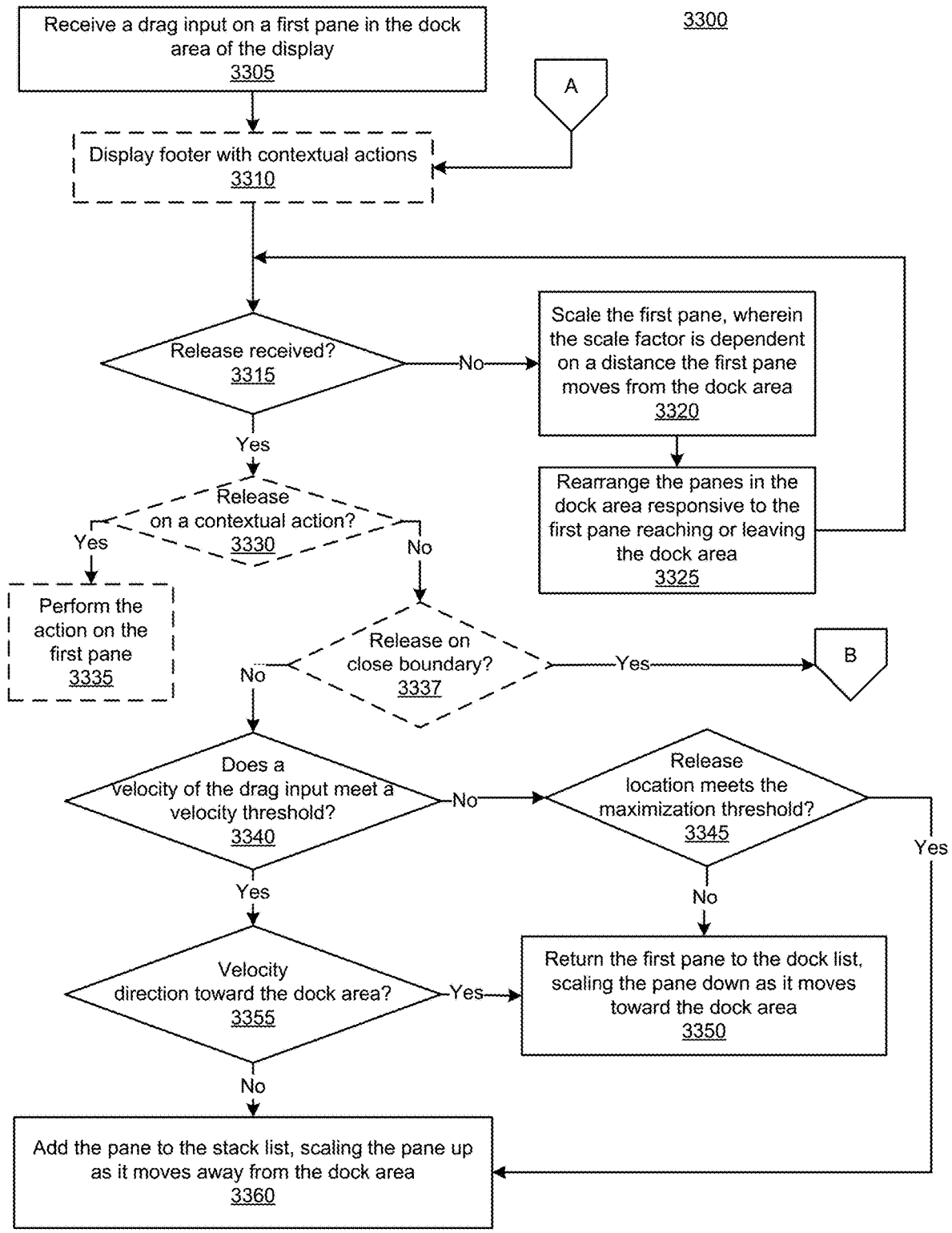
FIG. 33 illustrates a flow diagram of an example process for managing drag inputs in a multi-view environment, in accordance with disclosed implementations.

The multi-view library 200 may also include a multi-view manager 210. The multi-view manager 210 may include code, protocols, classes, and other data structures to manage the panes, the dock, the stack, and to interpret user input. For example, the multi-view manager 210 may handle several different dragging behaviors depending on attributes of the drag input, such as the beginning state of a pane, the type of drag, drag velocity, the location of the drag release, etc. An example drag state manager, a process for managing dragging behavior, is illustrated in FIG. 33. In some implementations, the multi-view library 200 may include protocols that enable the library 200 to be integrated into a host mobile application. This enables the library to provide functionality independently, so that features can be added to and/or modified in the library 200 without having to recompile or reinstall the host application. For example, the multi-view manager 210 may include protocols for communicating with the host mobile application to share control of gestures and manage updating of the content displayed in the panes.

The multi-view manager 210 may include an indication of where the dock area is located on the display. The dock area can be proximate to a footer. The multi-view manager 210 may include, for example, a minimum screen coordinate representing the start of the footer. In a top/bottom arrangement of the header/footer, the minimum screen coordinate may be a minimum y coordinate. The location of the dock area may be calculated from this value. The location of the dock area can be calculated from the minimum screen coordinate value and from a size of the panes in the minimized state. Implementations are not limited to top/bottom arrangements, and the minimum screen coordinate may be an x-coordinate.

In some implementations, the multi-view manager 210 may implement the panes using a particular content provider. The content provider can be any source of content, e.g., the mobile application integrating the multi-view library. For example, in one implementation each pane can be an instance of a WKWebView object. As another example, each pane can be an instance of a native interface generated by the mobile application. The multi-view manager 210 may provide an API with procedure calls that enable any mobile application to provide a source for the content, all the multi-view manager 210 when updates to the content are received, and to control certain properties of the container (pane). The properties can include one or more of the following: whether the content can be scrolled, whether the content can be overscrolled, whether the container can navigate backward, whether the container can navigate forward, and/or any of the properties of a pane discussed herein.

In some implementations, the panes opened using the multi-view library 200 facilitate temporary exploration. In other words, the open panes managed by the multi-view manager 210 may not be preserved if the mobile application is killed or the mobile device shuts down.

FIG. 3 is an example interface 300 generated by a mobile application using the multi-view library, in accordance with the disclosed subject matter. A mobile device, such as mobile device 100 of FIG. 1 may provide the display. In the example of FIG. 3 the mobile application is an Internet browser and the user has navigated to a website that facilitates finding homes to buy or rent. Therefore the view displayed is a web page identified by the URL 320. In some implementations, the interface 300 may include a clone control 330. The clone control 330 may be provided by a multi-view library, such as library 200 of FIG. 2. The URL 320 and clone control 330 may be part of a header provided by the mobile application. The interface 300 displays the content of the web page. The content includes several selectable areas 305. Each selectable area 305 is a hyperlink to a respective target page, e.g., in the example of FIG. 3, additional details about a particular property. The user may be interested in the first listed property and may select 310 the first hyperlink. If the selection 310 is a short touch input, the browser application acts in a conventional manner, e.g., opening the target web page and displaying the content in the interface 300. In other words, the content of the current webpage is replaced by the content of the target. On the other hand, if the selection 310 is a long touch input, the browser application uses the multi-view library to open the target into a new pane, as illustrated in FIG. 4.

FIG. 4 is an example interface 400 resulting from a long touch input of a hyperlink in the interface of FIG. 3, in accordance with the disclosed subject matter. In response to the long touch input, the mobile device generates a pane 450 that loads the content for the target of the hyperlink. The interface 400 illustrates that the pane 450 shows the content as it is still loading, as evidenced by the loading progress bar 455. Thus, the pane 450 displays an active view, which continues to load/update. The pane 450 is opened in a minimized state and is opened into a dock area 415 of the display. In some implementations, the pane 450 may initially be opened in a size smaller than the size of the pane 450 in the minimized state and be resized as it moves to the dock area 415, where it is displayed in the minimized state. The content of the original web page is in a current pane 405, i.e., a pane in a maximized state and added to a stack. In some implementations, the web page was opened in a current pane when the browser application opened. In some implementations, a pane is not generated until the multi-view functionality is invoked, e.g., via selection of the clone control 330 or a long touch input of a link. While the content of the pane 450 is loading, the user may select a second hyperlink in the current pane 405, e.g., by providing a long touch input 410 on the selectable area 305 for the third listed property in FIG. 4. In response to the long touch input 410 the browser application opens a second pane in the dock area 415 of the display, as shown in FIG. 5.

FIG. 5 is an example interface 500 resulting from the second long touch input on the second hyperlink in the interface of FIG. 4, in accordance with disclosed subject matter. In response to the long touch input, the mobile device opens a second pane 550 and begins loading the content of the target of the second hyperlink in the pane 550, as shown by the loading progress bar 555. While the content of the pane 550 is loading, the mobile device has finished loading the content of pane 450, as illustrated by additional content 560 that now displays in the pane 450. The pane 450 and the pane 550 are displayed in the dock area 415. As illustrated by the interface 500 of FIG. 5, a user can easily compare the content of the two panes and does not need to wait for one pane to load before opening a next pane. This decreases the time a user spends navigating. Not having to navigate to a tab switching interface also reduces the time a user spends navigating, making the interface more efficient. While the content of the pane 550 is loading, the user may select a third hyperlink in the current pane 405 by providing a long touch input 510. The long touch input 510 may correspond with a navigation control (link) that points to a page with images of a particular property. The long touch input 510 may cause the mobile device to open a new pane that loads the content identified by the third hyperlink, as illustrated in FIG. 6A.

FIG. 6A illustrates an example interface 600 showing pane 650 opening into the dock area 415 of a display. Pane 650 is opened responsive to the long touch input 510 of the third hyperlink in the interface of FIG. 5, in accordance with disclosed implementations. As illustrated, the new pane 650 can be opened while loading, as illustrated by progress bar 655. The pane 650 illustrates an implementation where a new pane opens in a size smaller than the size of a pane in the minimized state and is moved into the dock area 415. As the new pane 650 moves into the dock area 415, the mobile device creates a landing area 620 for the new pane 650 by moving pane 550 in direction A. The landing area 620 represents a middle portion of the dock area 415. The landing area 620 grows in proportion with the size and proximity of the pane 650. In other words, as the pane 650 increases in size and moves closer to the dock area 415, the landing area 620 also grows. When the pane 650 reaches the size represented by the minimized state, the landing area 620 is large enough to accommodate the pane 650, as illustrated in FIG. 6B. Implementations are not limited to the exact sequence illustrated, as the mobile device may begin creation of the landing area 620 before the pane 650 is visible and may resize the pane 650 in the landing area itself. Alternatively, the mobile device may create the landing area 620 and open the pane 650 at the size of the minimized state in the landing area 620. These various implementations are all considered opening the pane in the dock.

FIG. 6B illustrates the interface 600 of FIG. 6A after the pane 650 is displayed in the dock area 415. In the interface 600 of FIG. 6B, the content of pane 650 is still loading, as several pictures are not yet available. In the example of FIG. 6B, the content of pane 550 has now finished loading. All three panes 450, 550, and 650, are displayed in a minimized state in the dock area 415 of the interface 600. As the content of the pane 650 continues to load, the user may provide a scroll input 610 outside of the dock area 415. The scroll input is in a direction B, towards the header, which in the example of FIG. 6B scrolls the content of the current pane down (towards the end of the content). A scroll input outside the dock area 415 can be any input initiated outside the dock area 415 with a direction component generally in direction B (toward the header) or opposite direction B (away from the header).

FIG. 7 illustrates an example interface 700 generated from the scroll input performed on the interface of FIG. 6B, in accordance with some implementations. As illustrated in FIG. 7, the content of the current pane scrolls independently from the panes in the dock area. Thus, a user can continue to browse and select content from the current pane. Also as illustrated in FIG. 7, the content of the pane 650 continues to load while the scrolling occurs in the current pane 405. Thus, for example, image 755 is now available in the pane 650, but was not available before in interface 600. In the example of FIG. 7, the user would like to see the information covered by the panes in the dock area 415 and, therefore, provides a scroll input 710 in direction C. The scroll input for the example dock area 415 can be any scroll input having a component in the general direction of C or opposite of C. If the scroll input 710 meets a velocity threshold or if the scroll input 710 meets tuck criteria the system may tuck the panes of the dock so that the user can view the content that is obscured by the panes 450, 550, and 650. The velocity threshold is an indication of how fast the scroll input occurs. A scroll input that meets the velocity threshold may also be referred to as a flick or a throw. In the example of FIG. 7, the tuck criteria may represent the user scrolling a pane at the beginning of the dock list past a certain screen coordinate. For example, moving pane 550 to the right side of the display regardless of velocity.

Figure 8:
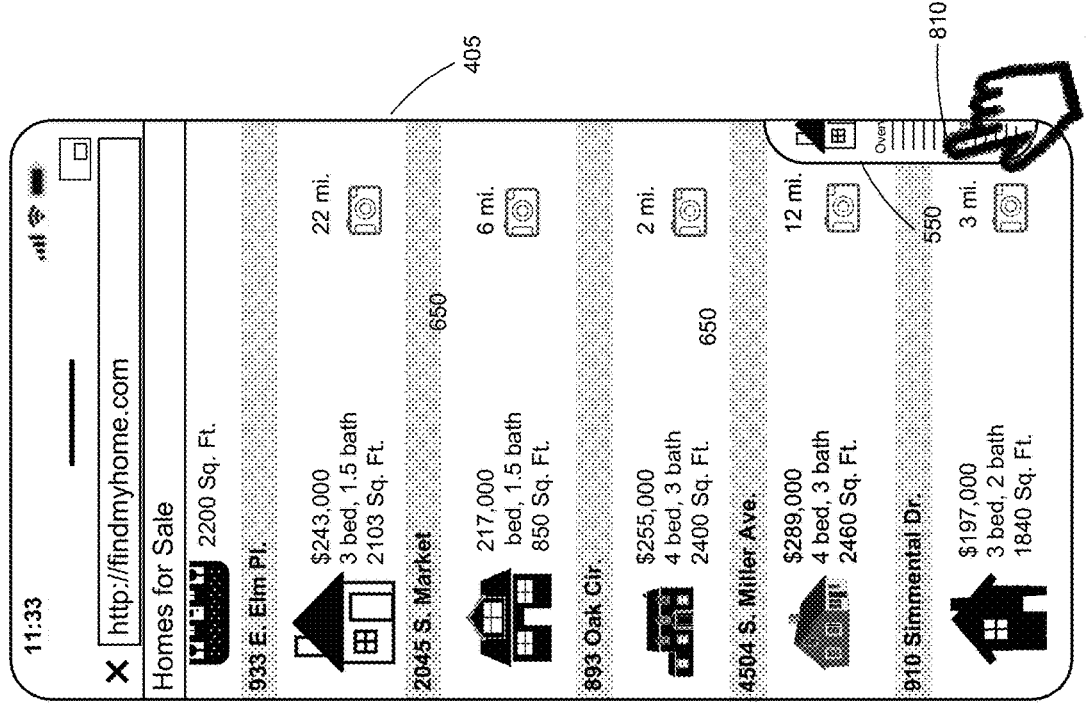
FIG. 8 illustrates an example interface generated from a scroll input that meets a velocity threshold or meets tuck criteria and is performed on the dock area of the interface of FIG. 7, in accordance with some implementations.

FIG. 8 illustrates an example interface 800 generated from a scroll input that meets a velocity threshold or meets tuck criteria and is performed on the dock area of the interface of FIG. 7, in accordance with some implementations. As illustrated in FIG. 8, the panes 450 and 650, which were to the right of pane 550 in the dock area 415 in FIG. 7, are now off display. In some implementations, the content of the panes may continue to load/update while off display. In some implementations, at least a portion of pane 550 remains visible in the dock area 415. When only a portion of one of the panes in the dock is visible, the dock can be referred to as tucked. This enables the user to view the content of the current pane 405 with minimal content obscured by the dock. The visible portion of pane 550 may be used as a reminder that the dock includes panes in a minimized state and to enable the user to untuck the dock. When the user is ready to see the panes in the dock the user may provide an input 810 on the visible portion. The input 810 may be a short touch input. The input 810 may be a scroll or drag input that ends in the direction opposite that of direction C (of FIG. 7). Either type of input 810 may cause the mobile device to untuck the dock. In contrast, if the input 810 is a drag input that initially has a direction opposite that of direction C and then the user drags back in direction C, the input 810 would fail to untuck the dock. In other words, in the example of FIG. 8, if a user touches the visible portion of pane 550, drags left and then drags right before releasing the drag input, the panes may stay tucked. In some implementations, the location of the drag input may determine whether the panes remain tucked or untucked.

Figure 9:
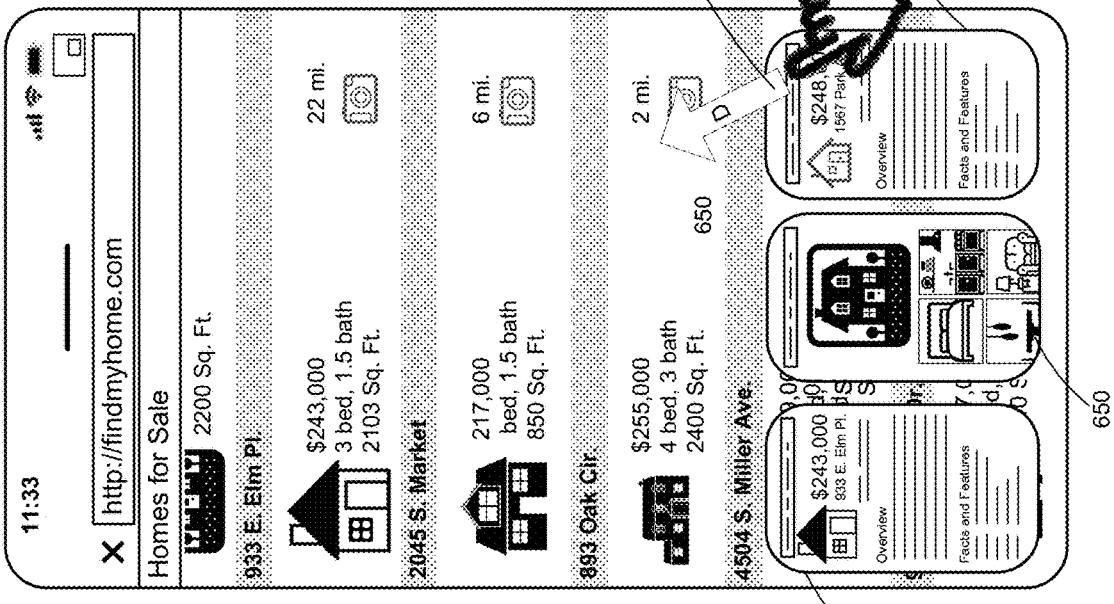
FIG. 9 illustrates an example interface generated from an input that untucks the panes in the tucked dock of FIG. 8, in accordance with some implementations.

FIG. 9 illustrates an example interface 900 generated from an input that untucks the dock of FIG. 8, in accordance with some implementations. As a result of either a short touch input on the visible portion of pane 550 of FIG. 8 or a drag/scroll input of pane 550 to the left of the display, the mobile device makes each pane 550, 450, and 650 visible. This may be referred to as untucking the dock. If other panes are in the dock, they may be off display. In some implementations, untucking the dock may result in the panes at the beginning of the dock being visible. In other words, if the dock area displays three panes at a time, the first three panes in the dock may be displayed after the dock is untucked. In some implementations, a short tap input may display the middle three (or other predetermined number) panes in the dock list. After the panes are again visible in the dock area the user may initiate a drag input 910 in direction D on pane 450. Direction D is generally away from the dock area.

Figure 10:
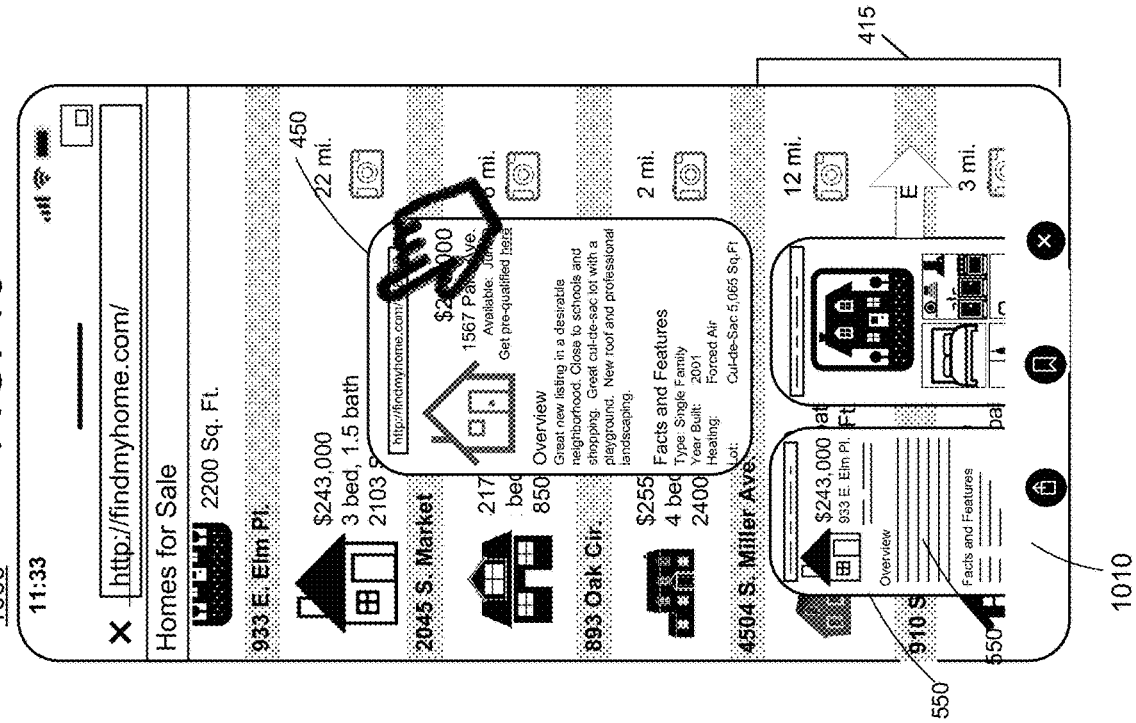
FIG. 10 illustrates an example interface generated during a drag input performed on a pane in the dock area of the interface of FIG. 9, in accordance with some implementations.

FIG. 10 illustrates an example interface 1000 generated during a drag input 910 performed on pane 450, in accordance with some implementations. In the example of FIG. 10, the drag input is ongoing. In other words, the user has not released the drag input. Thus, pane 450 is in a dragging state. During a drag input the pane 450 is resized, getting larger as it moves away from the dock area 415 and smaller as it moves toward the dock area 415. The size of the pane 450 may be a function of the distance from the dock area 415. The size of the pane 450 may be a function of the distance from a maximization threshold. The maximization threshold is a screen coordinate that determines whether a pane in a draggable state (i.e., the object of a drag input that has not been released) moves to the stack or to the dock when released. In the example of FIG. 10, the maximization threshold is a y coordinate because the header/footer is a top/bottom arrangement. The maximization threshold can be a mid-point between the dock area 415 and a header. The maximization threshold can be closer to the header than the dock area 415. The maximization threshold can be within a predetermined distance of a header. The maximization threshold can be proximate the header. In some implementations, the maximization threshold can be a parameter set by the mobile application. In some implementations, the maximization threshold is set by the multi-view manager. The maximization threshold enables a user to move a pane from the dock, make it bigger during the drag, view the contents and release the drag, sending the pane back to the dock in one gesture. For example, if the user releases the drag input at a location where the pane 450 fails to meet the maximization threshold, the mobile device will automatically return the pane 450 to the dock.

As illustrated in FIG. 10, when a pane is moved from the dock area 415 during a drag input, the mobile device rearranges the panes in the dock area 415 (e.g., pane 550 and pane 650) to eliminate the space vacated by the pane 450. In the example of FIG. 10, the panes 550 and 650 move in direction E to eliminate the space previously occupied by pane 450. In some implementations, the panes remaining in the dock do not move and eliminate the space vacated by the pane in the draggable state until it is determined that the pane in the draggable state has been moved to the stack. In some implementations, the panes may move once the pane in the draggable state leaves the dock area 415. Once the panes remaining in the dock have eliminated the space vacated, if the pane 450 is returned to the dock, the pane may return in the middle of the dock area, as discussed herein.

FIG. 10 also illustrates a contextual footer 1010. The contextual footer may be displayed in response to a pane entering a draggable state. In other words, in response to the drag input on pane 450, the mobile device may display the footer 1010. The footer 1010 may include one or more contextual actions. A contextual action is an operation that is available to be performed on a pane, or unavailable to be performed on the pane, depending on the current state of the pane. The user may drag the pane, e.g., pane 450, over an actionable area or icon representing the action. In response, the action may be performed on the pane 450. For example, to close a pane, the user may drag the pane over the contextual action in the far right of the footer 1010.

Figure 11:
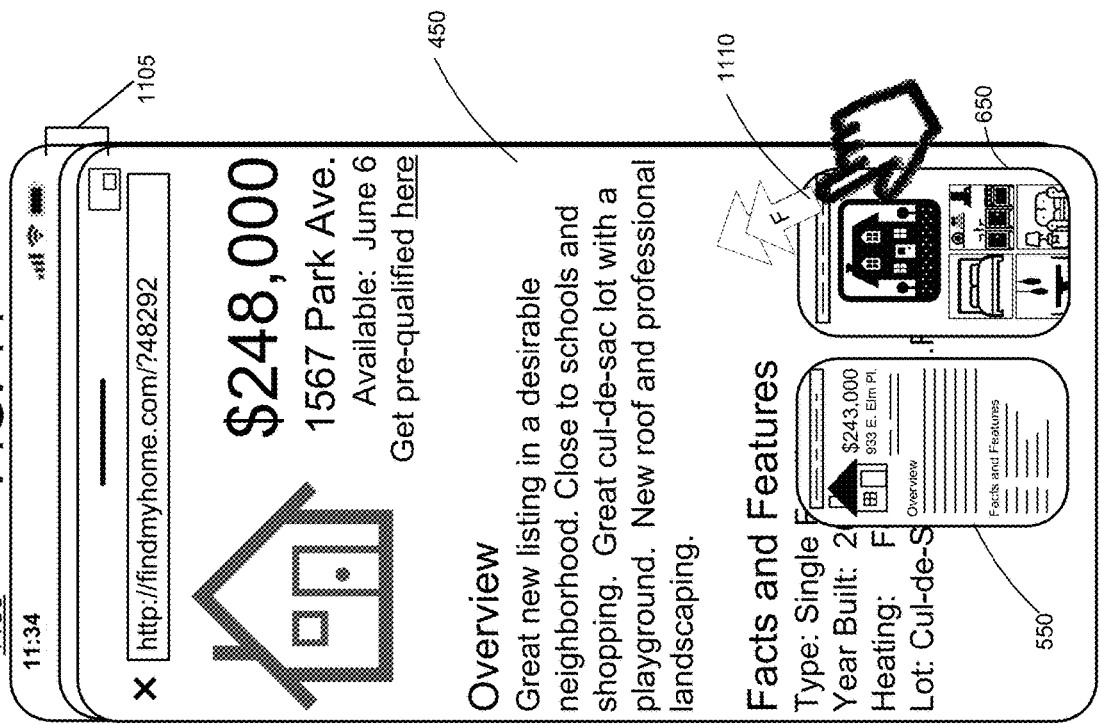
FIG. 11 illustrates an example interface generated from release of the drag input illustrated in FIG. 10 meeting (occurring at or beyond) the maximization threshold, in accordance with some implementations.

FIG. 11 illustrates an example interface 1100 generated from release of the drag input illustrated in FIG. 10 that occurs when the pane meets the maximization threshold, in accordance with some implementations. In the example of FIG. 11, the content of pane 450 is added to the stack and becomes the current pane, covering (or replacing) the content of the previous current pane. The addition of pane 450 to the stack means that the stack includes more than one pane and, therefore, the mobile device may display a stack selection area 1105. The stack selection area 1105 provides a visual indication that the stack contains at least two panes. The stack selection area 1105 is also actionable. For example, a short touch input in the stack selection area may cause the pane that is at the top of the stack to move to the back of the stack, making the next pane in the stack the current pane. In the example of FIG. 11, the user performs a drag input 1110 on pane 650, i.e., in a direction away from the dock area, and with a velocity that meets the velocity threshold. For example, direction F may represent the direction of the input 1110. Because the input 1110 meets the velocity threshold, it is considered a throwing gesture. As illustrated in FIG. 11, the throwing gesture need not be exactly in the direction of the header. Instead, as long as the direction of input 1110 is generally headed away from the dock area, the input 1110 can be considered a throwing gesture when it meets the velocity threshold. A throwing gesture performed on a pane in the dock may move the pane to the stack.

FIG. 12 illustrates an example interface 1200 generated as a result of the throwing gesture described with regard to FIG. 11, in accordance with some implementations. In the example of FIG. 12, the pane 650 has been removed from the dock and added to the stack, becoming the current pane. The pane 550 that remains in the dock has moved to eliminate the space vacated by pane 650. In the example of FIG. 12, the stack selection area 1105 is modified to reflect the presence of another pane in the stack. In other words, in some implementations, the appearance of the stack selection area may give an indication of the number of panes in the stack that are not visible. Although not illustrated in the figures, the mobile device may resize pane 650 as it moves from the dock to the stack. In the example interface 1200 the user may perform a back input 1210. In some environments, e.g., where pages are turned from right to left when reading, a back input may be a swipe right, which simulates turning a page of a book towards the beginning of the book. In other environments, where pages of a book are turned left to right when reading, a back input may be a swipe left. In other environments, the back input may be a swipe down. The direction of a back input represents the direction a user would expect to turn a paper page when reading. The back input is a swipe, or in other words a short touch-drag-release having a direction and a distance. The back input can also be referred to as a scroll input in a direction perpendicular to the content scroll direction. Thus, for example, if a user scrolls content in an up or down direction, the back input is a scroll input to the right (or left).

In a multi-view environment, when the page displayed in the current pane is the top of the back stack (e.g., the back stack for the pane is empty), a back input outside of the dock area may result in the current pane being transferred to a draggable state. In some implementations, this back input may only transfer the current pane to a draggable state if the input meets a resistance threshold. In some implementations, the back input meets the resistance threshold when it has at least a predefined length. For example, a short swipe may fail to meet the resistance threshold and a longer swipe meets the threshold. The resistance threshold ensures that the pane is not accidently transferred to the draggable state.

FIG. 13 illustrates an example interface 1300 generated from a back input 1210 performed on the current pane of the interface of FIG. 12 that meets a resistance threshold, in accordance with some implementations. Put another way, the interface 1300 results from the back input 1210 if FIG. 12 meeting the resistance threshold. In response to this event, pane 650 is removed from the stack and is in a draggable state. The next pane on the stack, e.g., pane 450, becomes the current pane. The user can move the pane 650 in any direction while in the draggable state. If the user simply releases the drag, the mobile device will send the pane 650 to either the stack or the dock, depending on the location of the pane 650 with regard to the maximization threshold at the time of release. Alternatively, the user can throw the pane to either the stack or the dock. A throw occurs when the user releases the drag at a point where the velocity of the drag meets a velocity threshold. If the user throws the pane 650 in direction H, the mobile device will move the pane 650 back to the stack regardless of where the pane is when the drag is released, or in other words regardless of the maximization threshold. Likewise, if the user throws the pane 650 in direction I, the mobile device will move the pane 650 to the dock regardless of the maximization threshold.

FIG. 14 illustrates an example interface 1400 illustrating a possible result of the drag input illustrated in the interface of FIG. 13, in accordance with some implementations. In the example of FIG. 14, the user has either released the pane 650 at a location that fails to meet the maximization threshold or has thrown the pane 650 in direction I, or a similar direction, toward the dock area. As a result, pane 650 is added to the dock list and pane 450 remains the current pane. The user may then provide a short touch input 1410 in the stack selection area 1105. As discussed earlier, a short touch input 1410 may result in the current pane (e.g., pane 450) being sent to the back of the stack and the next pane in the stack becoming the current pane.

FIG. 15 illustrates an example interface 1500 generated by a short touch input on the stack selection area 1105 of the interface of FIG. 14, in accordance with some implementations. The content of pane 450 is now hidden, e.g., covered by, the content of the next pane in the stack. The stack selection area 1105 indicates that there are still other panes in the stack, e.g., at least pane 450. The user may select 1510 the clone control 330. Selection of the clone control 330 causes the mobile device to generate a new pane and move it to the dock. The content of the new pane is the same as the current pane. In some implementations, the scroll offset of the new pane has the same value as that of the current pane. For example, each pane may track a scroll offset from the top of the content for the pane. The clone control 330 makes a copy of the current pane and also copies the scroll offset of the current pane.

Figure 16:
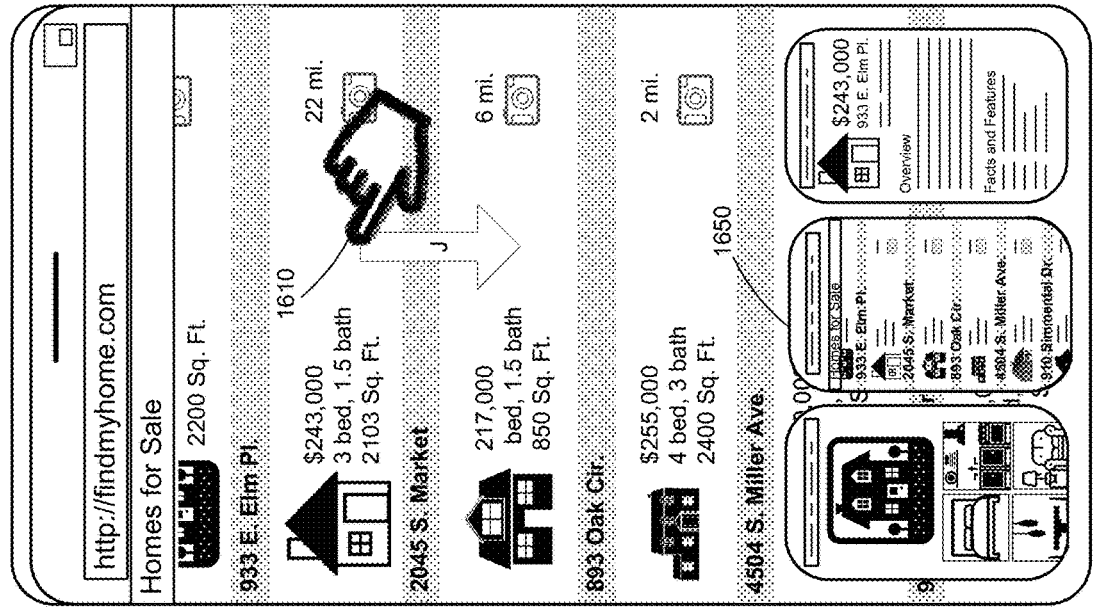
FIG. 16 illustrates an example interface generated by selection of the clone control of the interface illustrated in FIG. 15, in accordance with some implementations.

FIG. 16 illustrates an example interface 1600 generated by selection of the clone control 330 of the interface illustrated in FIG. 15, in accordance with some implementations. In the example of FIG. 16, the dock area includes pane 1650, which is a clone of the current pane. In the example of FIG. 16, the pane 1650 has the same scroll offset as the current pane. In the example of FIG. 16, the pane 1650 has been inserted into the middle of the dock area. In other implementations, the pane 1650 may be inserted at the end of the dock list or at the beginning of the dock list. The user may provide a scroll input 1610 in direction J (away from the header) outside the dock area. In response, the system scrolls the content of the current pane, as illustrated in FIG. 17.

Figure 17:
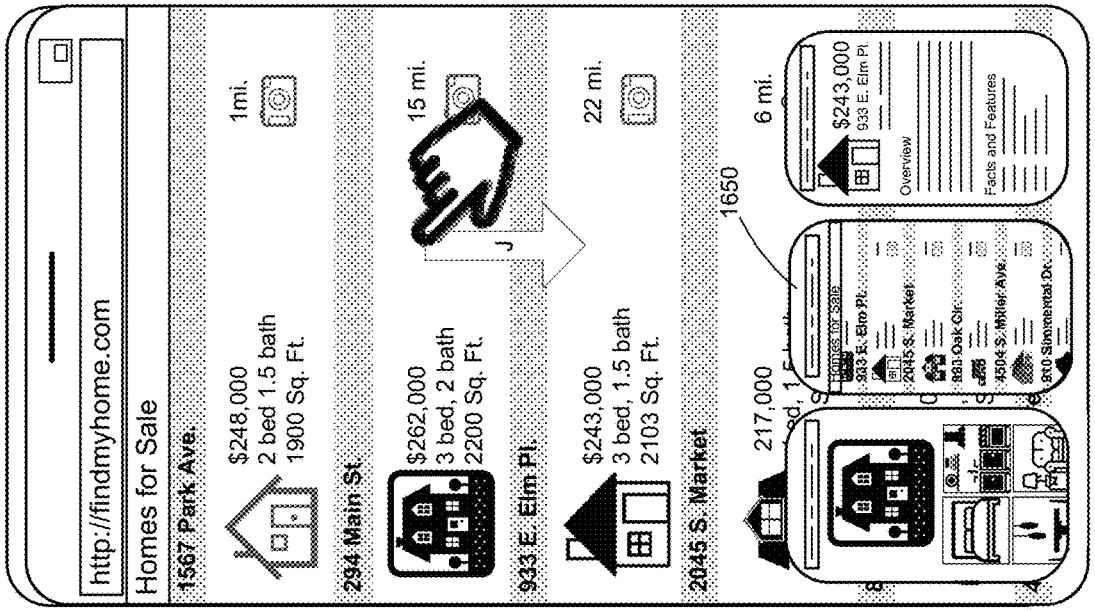
FIG. 17 illustrates an example interface generated by scrolling the content of the current pane illustrated in the interface of FIG. 16, in accordance with some implementations.

FIG. 17 illustrates an example interface 1700 generated by scrolling the content of the current pane illustrated in the interface of FIG. 16, in accordance with some implementations. In the example of FIG. 17, the user continues to scroll in direction J. However, the content in the current pane cannot be scrolled in that direction any more. Conventionally, further scrolling once the top is reached in a browsed web page will be interpreted as a refresh of the page. This is also referred to as overscrolling. In some implementations, overscrolling results in the current pane entering a draggable state and being removed from the stack, rather than resulting in a refresh of the content. Overscrolling occurs when there is no additional content to scroll and a scroll input meets a resistance threshold.

Figure 18:
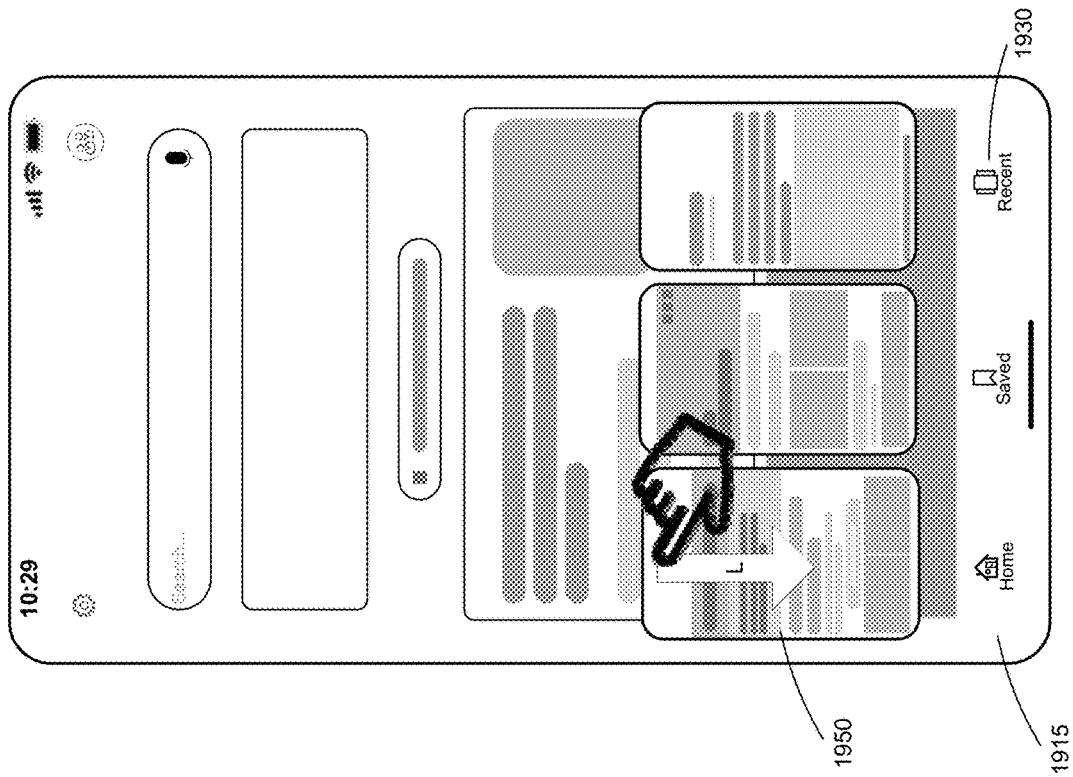
FIG. 18 illustrates an example interface generated as a result of an overscroll of the current pane of the interface of FIG. 17, which initiates a dragging state, in accordance with some implementations.

FIG. 18 illustrates an example interface 1800 generated as a result of an overscroll condition occurring in the interface of FIG. 17, in accordance with some implementations. In the example of FIG. 18, the pane 1850 is now in a draggable state and is the subject of a drag input. The pane 1850 can be dragged in any direction and is resized by the multi-view manager. The mobile device may resize the pane 1850 in accordance with its proximity to the dock area. Thus, for example, the panes in the dock move to make room for the pane 1850, e.g., in landing area 1820. In the example of FIG. 18, the mobile device moves pane 650 off display to create landing area 1820. Other implementations (not illustrated) may move pane 550 off display and create landing area 1820 between panes 650 and 1650. Other implementations may make room in a similar manner but with the landing area 1820 in another position on the display.

Figure 19:
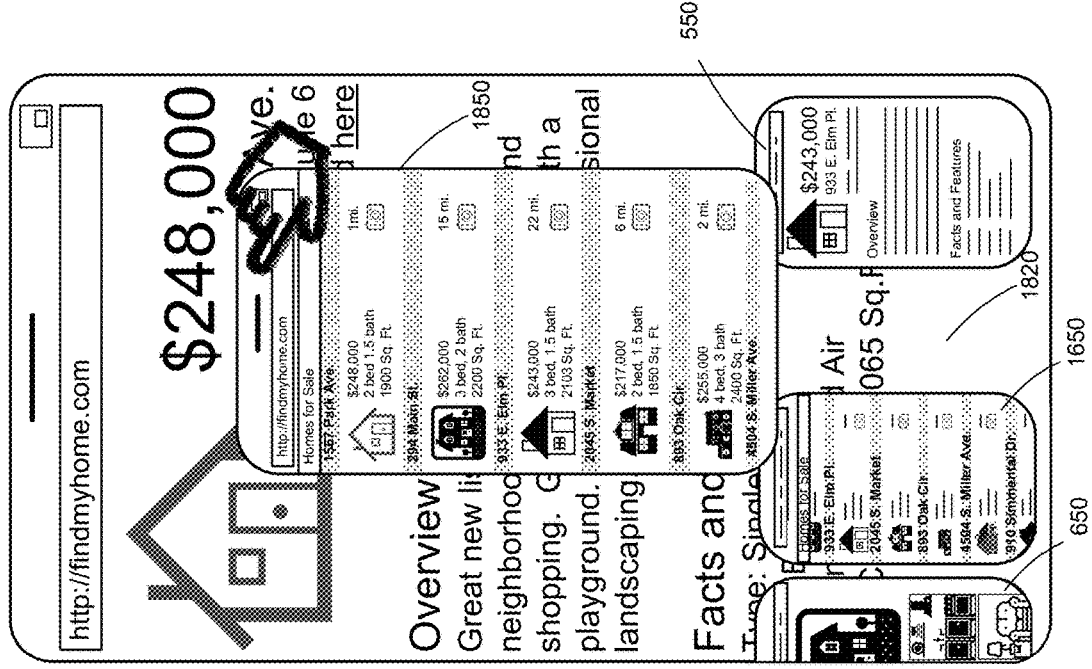
FIG. 19 illustrates an example interface generated by a mobile application that uses the multi-view library, in accordance with some implementations.

FIG. 19 illustrates an example interface 1900 generated by a mobile application that uses the multi-view library, in accordance with some implementations. In the example of FIG. 19, the mobile application is a search assistant, but could be another kind of mobile application, such as a shopping application, a reservation application, a review application, a travel application, etc. Thus, the views, i.e., content of the panes, are not limited to web pages. In the example of FIG. 19, the interface 1900 includes a dock area with three panes in a minimized state. The current pane is a home page for the search assistant application. In some implementations, the home page may be a pane that cannot be moved from the stack. In other words, in such implementations, the content of the home page never enters a draggable state or a minimized state. The interface 1900 also includes a footer 1915. The footer 1915 may be displayed no matter what pane is the current pane. In some implementations, the multi-View manager has a minimum footer position. The mobile device may define the dock area as proximate to this position. Thus the footer may be visible even when panes are in the dock area. The footer 1915 may include several navigation areas. In the example of interface 1900, the navigation areas include home, saved, and recent 1930. The home navigation control may display the home page as the current pane when selected. In some implementations, selecting the home navigation control may automatically move any panes in the stack that are not the home page to the dock list. In such implementations, the panes moved to the dock list may be animated (e.g., scaled down as they move to the dock area and any panes in the dock area rearranged to create landing areas. The saved navigation control may display a list of saved (or bookmarked) locations when selected. The recent navigation control 1930 may display a list of recently visited locations (documents, links, pages, database records, etc.). In the example of FIG. 19, the user performs a drag input on a pane 1950 in direction L toward the footer. Because the pane 1950 is in a minimized state, the drag input of the pane 1950 in a direction toward the footer may be interpreted as a dismissal of the pane.

Figure 20:
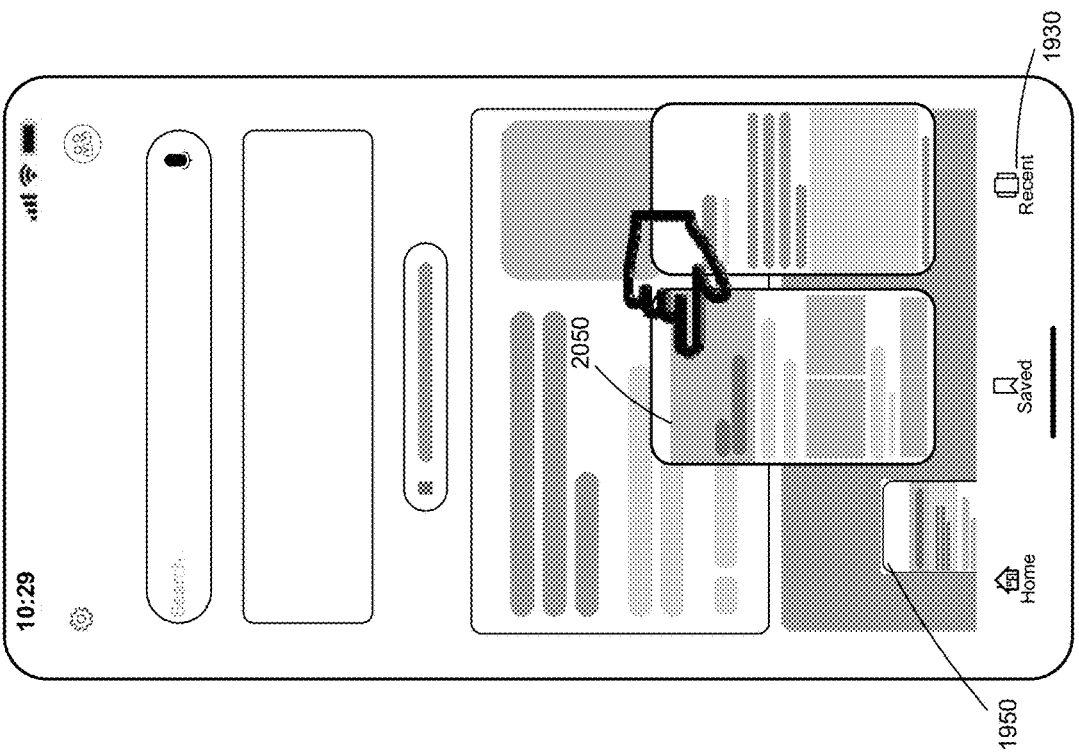
FIG. 20 illustrates an example interface generated in response to a drag input in the direction of the footer performed on a pane in the dock area of the interface illustrated in FIG. 19, in accordance with some implementations.

FIG. 20 illustrates an example interface 2000 generated in response to the drag input in the direction of the footer performed on a pane in the dock of the interface illustrated in FIG. 19, in accordance with some implementations. The interface 2000 illustrates that the result of the drag input is reduction in the size of pane 1950 as it moves to the footer. The pane 1950 is removed from the dock and eventually closed. In some implementations, the mobile device may add the location of the content (e.g., the URL, deep link, document path and name) to the list of recent locations. In some implementations the interface 2000 may include a change in the appearance of the recent navigation control 1930 to indicate that the location associated with pane 1950, which is now closed, has been added to the list of recent locations. The user may then provide a long touch input on pane 2050.

Figure 21:
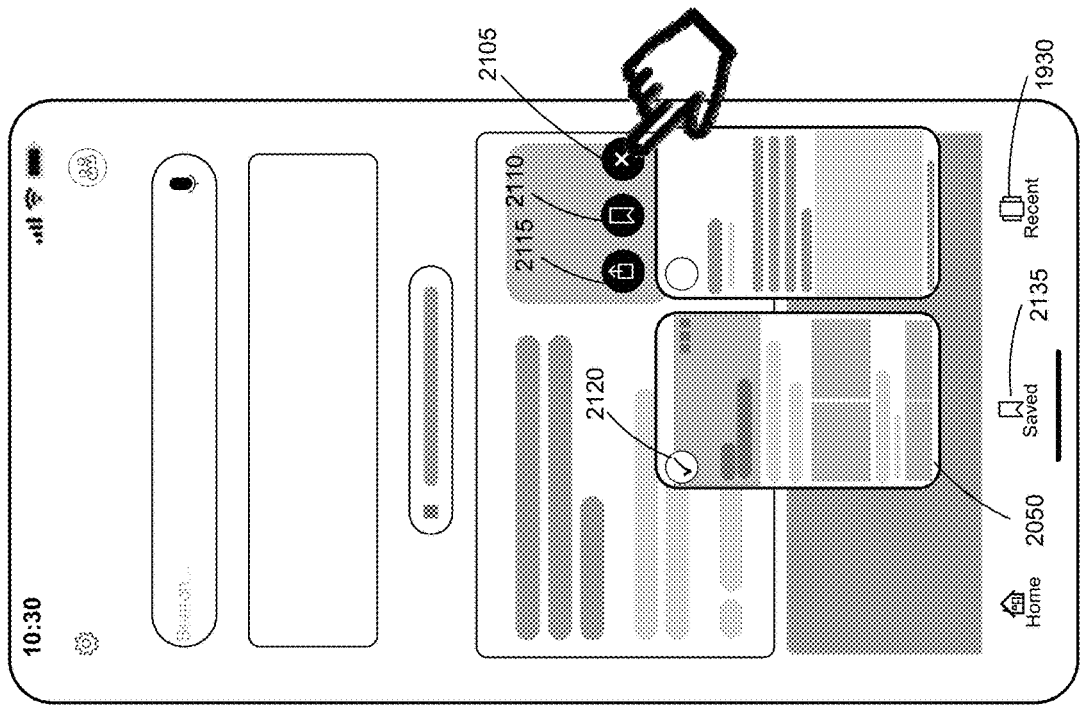
FIG. 21 illustrates an example interface showing contextual actions generated in response to a long touch input on a pane in the dock area, in accordance with some implementations.

FIG. 21 illustrates an example interface 2100 showing contextual actions generated in response to a long touch input on pane 2050 of FIG. 20, in accordance with some implementations. In response to the long touch input, the mobile device may provide contextual actions selectable via actionable areas 2105, 2110, and 2115. The actionable areas may appear near the dock area. The actionable areas may include an icon. In some implementations, the long touch input may also cause the mobile device to activate a toggle control 2120 for each pane in the dock area. The toggle control 2120 may enable the user to apply the contextual actions to one or more of the panes in a minimized state. In some implementations, the toggle control for the pane on which the long touch input occurred, e.g., pane 2050, has a default state of selected. Thus, as illustrated in interface 2100, the toggle control 2120 has a check mark indicating a state of selected for the toggle control 2120. The other pane in the dock area of interface 2100 has a toggle control with an unselected state by default. The state of the toggle control 2120 is changed from selected to unselected in response to a short touch input of the control.

In the example of FIG. 21, the contextual actions include an actionable area 2105 for a close action and an actionable area 2110 for a save or bookmark action. In some implementations, when the user provides a short touch input on the actionable area 2105, the mobile device closes any pane in the dock that has a toggle control with a selected state. In some implementations, the locations associated with closed panes are added to the list of recent locations, accessible via control 1930. Similarly, in response to the user providing a short touch input of the actionable area 2110, the mobile device adds the locations associated with selected panes (i.e., panes with a toggle control having a selected state) to saved locations, e.g., accessible via control 2135. In some implementations, other contextual actions may be provided with respective actionable areas and the actions applied to selected panes. In the example of FIG. 21, the user performs a long touch input on the actionable area 2105 for the close action. In response, as illustrated in interface 2200 of FIG. 22, the mobile device may change the toggle state of each pane in the dock to selected and change the actionable area 2105 to actionable area 2105' to indicate the action applies to all panes in the dock. A long press of the actionable area 2105 in FIG. 21 thus provides a shortcut for applying the close action to all panes in the dock.

Figure 23:
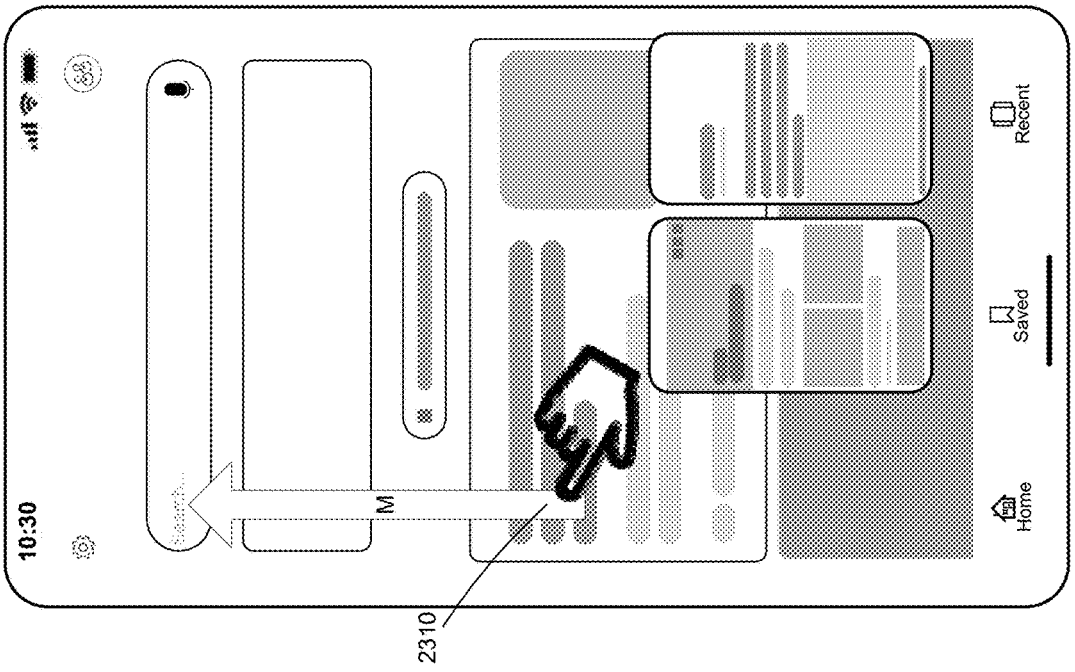
FIGS. 23 and 24 illustrates an example interface for automatically tucking the panes in the dock area off the display in response to a scroll input that meets scroll threshold, in accordance with some implementations.
Figure 24:
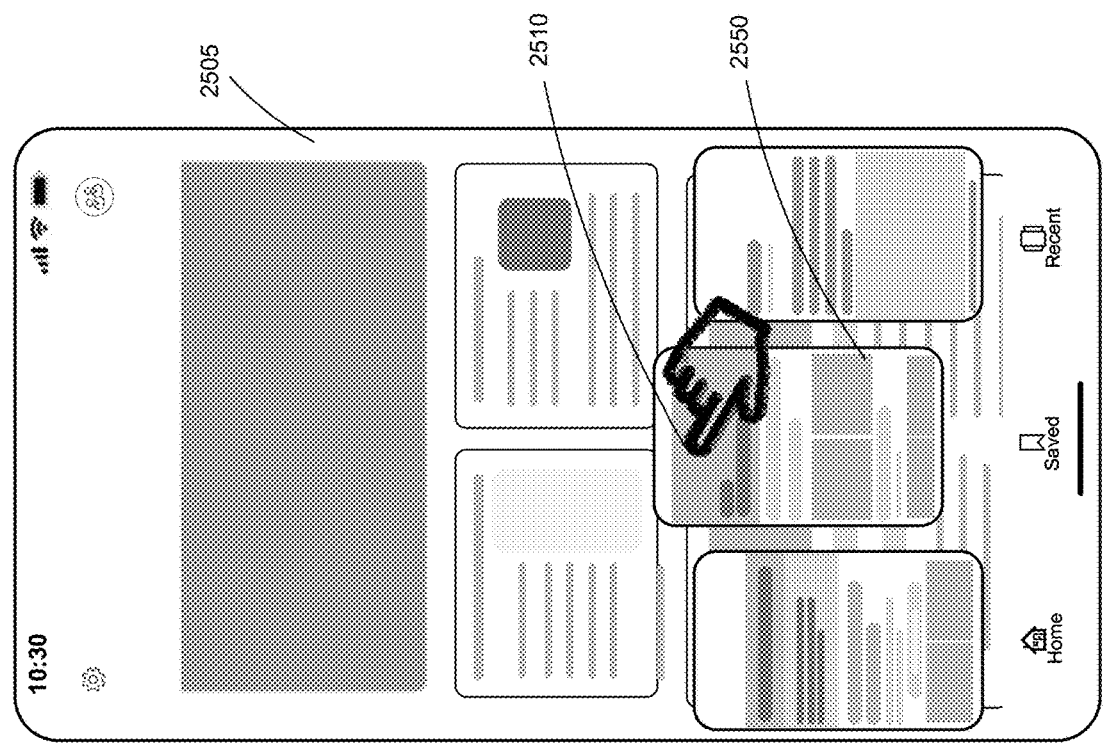

FIGS. 23 and 24 illustrate automatically tucking the panes in the dock area off display in response to a scroll input that meets scroll threshold, in accordance with some implementations. In the example of FIG. 23, the user provides a scroll input 2310 in direction M, toward the header. The scroll input 2310 meets a scroll threshold. The scroll threshold represents a movement of some predetermined amount. For example, the duration (e.g., length) of the scroll or velocity of the scroll may indicate the user wants to scroll quickly rather than leisurely. In response to receiving input 2310, the mobile device automatically tucks the panes in the dock, as illustrated in FIG. 24. As discussed with regard to FIG. 8, tucking removes all panes except one from the display and only a portion, e.g., 2405, of the one pane is still visible on the display. The portion 2405 can be used to untuck the panes, as discussed with regard to FIG. 9. While the panes in the dock area of the interface 2400 are shown tucked to the right of the display, implementations cover other tuck directions. In general, panes can be tucked in either direction that the panes can be scrolled in the dock.

Figure 25:
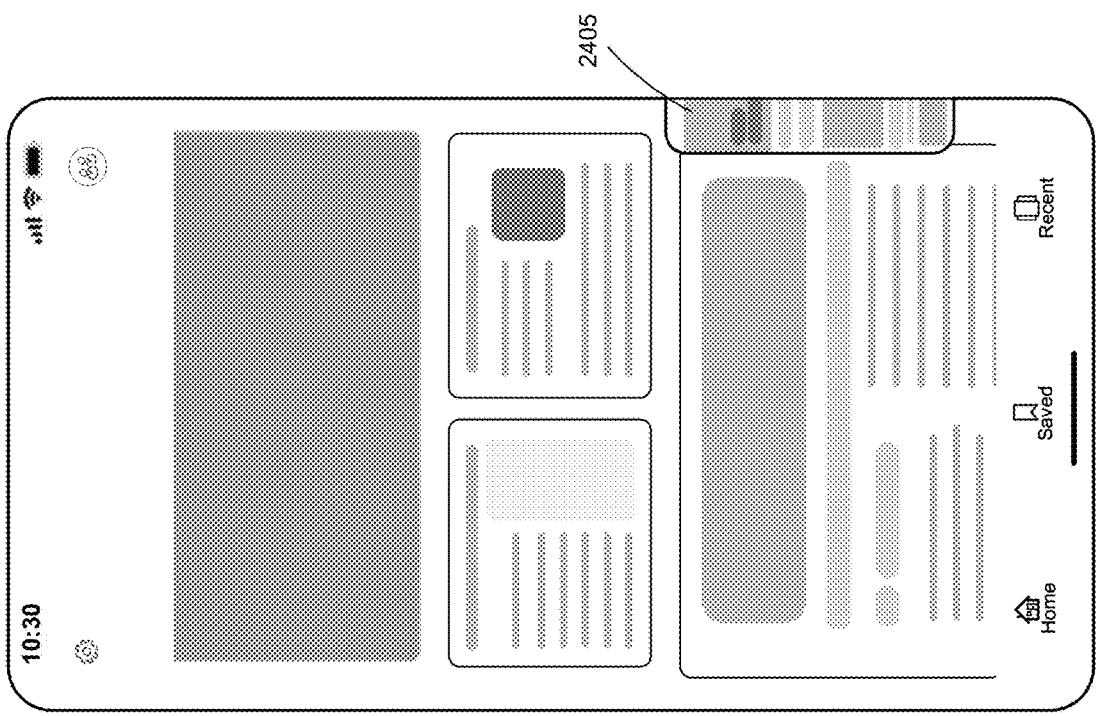
FIGS. 25 to 27 illustrates an example interface for rearranging panes in a dock area of the display, in accordance with some implementations.
Figure 27:
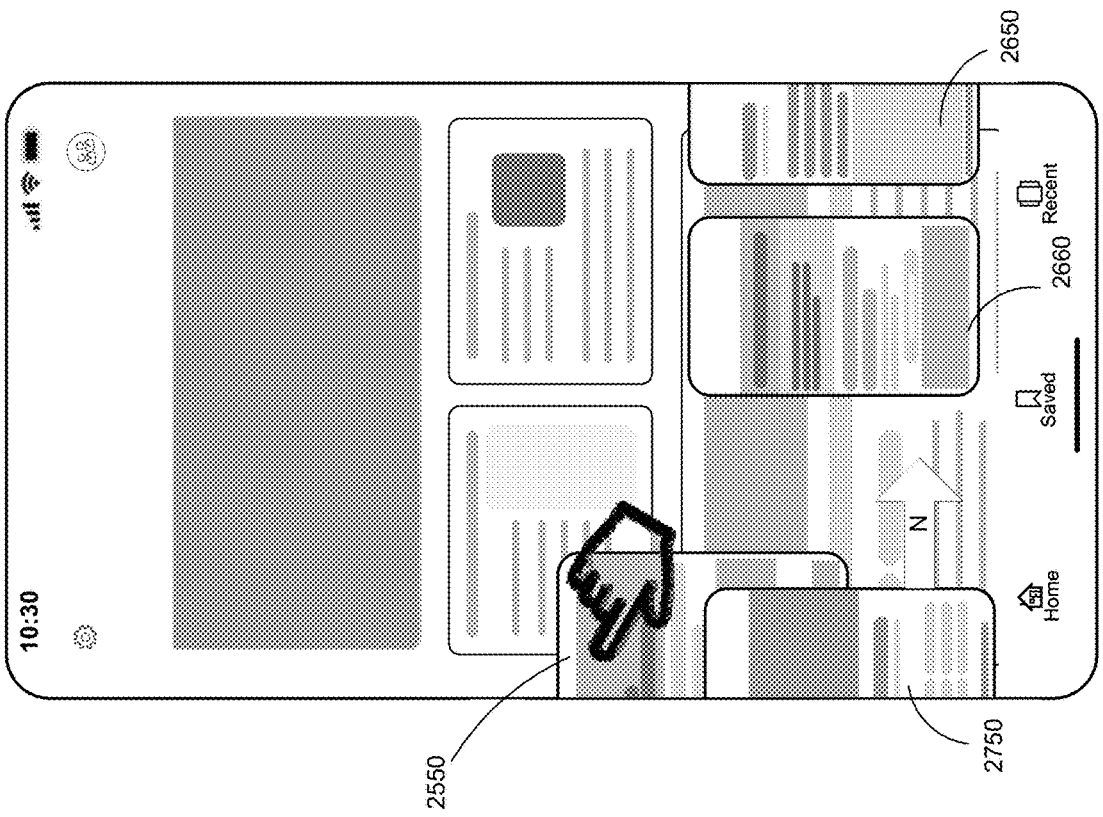
Figure 26:
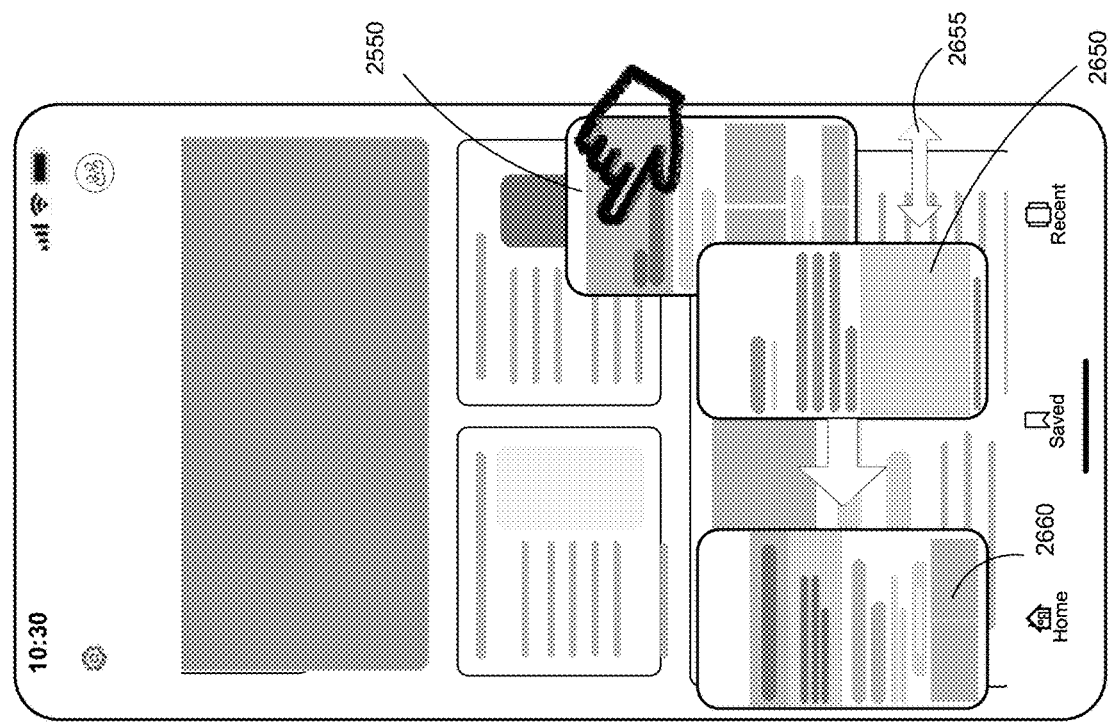

FIGS. 25 to 27 illustrates an example interface for rearranging panes in a dock area of the display, in accordance with some implementations. In the example of FIG. 25, the user has selected pane 2550 for a drag input, but any of the panes displayed in the dock area can be selected for a drag input. The pane 2550 is shown in a draggable state and is being dragged via input 2510. To re-arrange the panes in the dock area, the user drags the pane 2550 either to the right or to the left. In some implementations, the content of the current pane 2505 is blurred while the pane 2550 is in the draggable state. In the example interface 2600 of FIG. 26, the user has dragged the pane 2550 to the right. As a result, the mobile device is moving pane 2650 to the left to create a landing area 2655 for the pane 2550, in case the user decides to end the drag input when the pane 2550 is over/touching the landing area 2655. If the user does not end the drag input over the landing area 2655, but instead drags the pane 2550 to the left, the mobile device may move pane 2650 back to its original position. If the user continues to drag the pane 2550 to the left, the mobile device may move pane 2660 to the right to create a landing area to the left of pane 2660. If there are panes in the dock that are currently off display, in some implementations, bringing the pane in the draggable state, e.g., 2650, to an edge of the display causes the panes in the dock to scroll, as illustrated in FIG. 27. For example, when the user drags pane 2550 to the left edge of the display illustrated in interface 2700, the pane that is off display, e.g., pane 2750, begins to scroll into the dock area, e.g., in direction N. The pane that is the furthest right, e.g., pane 2650, begins to move off display.

Figure 28:
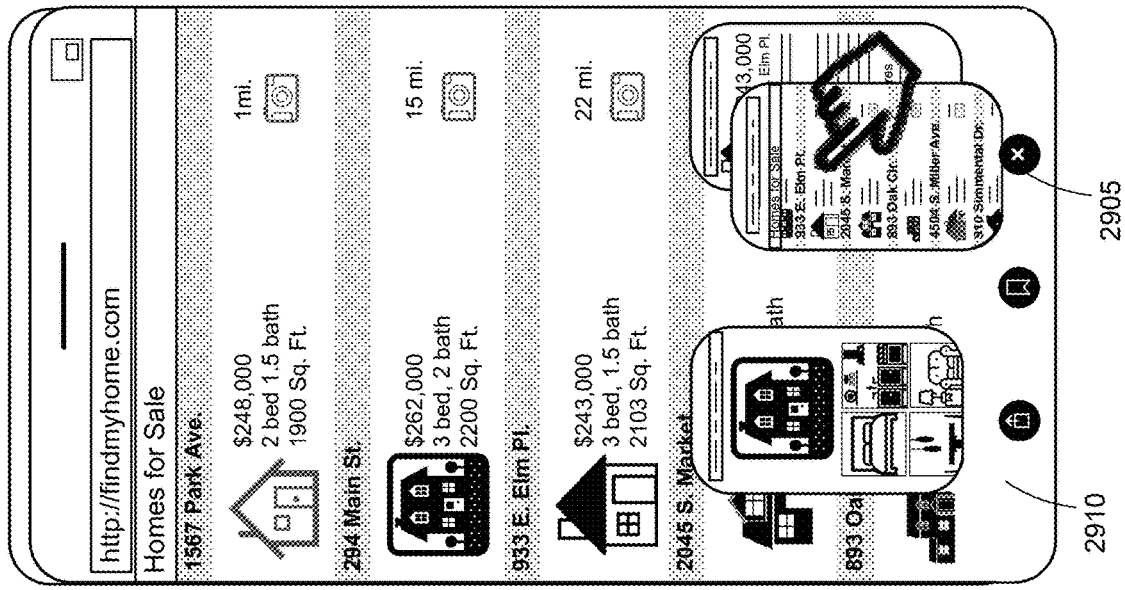
FIGS. 28 and 29 illustrates an example interface having a contextual footer with contextual actions that appears when a drag input is initiated on a pane in the dock area of the display, in accordance with some implementations.
Figure 29:
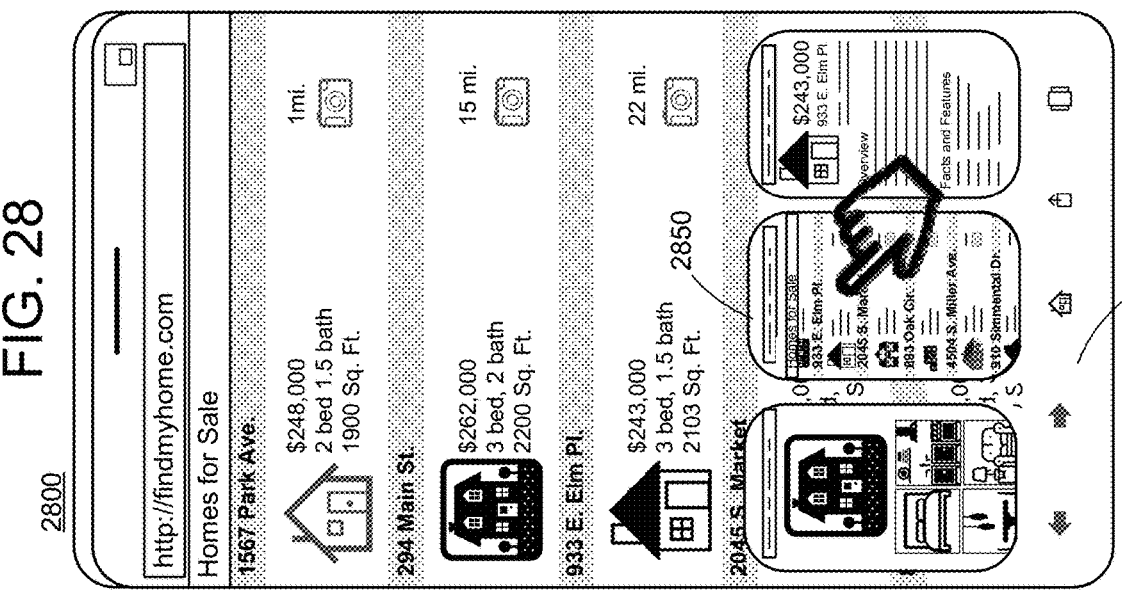

FIGS. 28 and 29 illustrate an example interface having a contextual footer with contextual actions that appears when a drag input is initiated on a pane in the dock area of the display, in accordance with some implementations. In the example interface 2800, the dock area displays three panes. The mobile application also displays an optional footer 2810. In the example of FIG. 28, a user has selected, e.g., via a long touch input or a drag input, one of the panes 2850. In response to the selection of pane 2850, e.g., via a long touch input or via a drag input, the mobile device changes the footer 2810 to footer 2910, as illustrated in interface 2900 of FIG. 29. The contextual actions are similar to those discussed in regard to FIG. 21, but the actionable areas appear in footer 2910. In the example of FIG. 29, the user drags pane 2850 to an actionable area 2905 associated with a close action. If the user releases the pane 2850 over the actionable area 2905, the mobile device will close the pane 2850. In some implementations the location (e.g., web page, document, etc.) associated with the pane 2850 will be saved in a list of recent locations.

The user interfaces illustrated in FIGS. 3 to 29 are example interfaces and implementations include interfaces having differently arranged elements. For example, while the interfaces have a header at the top and a footer at the bottom, implementations cover interfaces having a different header/footer configuration. Additionally, while a scrolling content on the current pane is described as being up or down, implementations cover an interface where content in the current pane is scrolled left to right or right to left. In general, reference to scrolling up refers to scrolling content in the current pane in a direction that causes content positioned later in the file to be displayed and scrolling down refers to any direction that causes content positioned earlier in the file to be displayed. Similarly, while scrolling the panes in the dock is described as left to right, in some implementations the panes in the dock can be scrolled up and down. Rearranging the panes in such an implementations can be performed by moving panes up/down within the dock rather than left/right. Similarly, the value of the thresholds discussed may be set in the multi-view library and/or may be set by the mobile application. In some implementations, the mobile application may provide a variable value to the multi-view library, which calculates the thresholds based on the value. Furthermore, while the interfaces depicted in FIGS. 3 to 29 are described for a browser application and a search assistant, techniques disclosed herein can be applied to other mobile applications. Finally, implementations are not limited to the particular icons illustrated in the various interfaces or shape of the panes. Additionally, while the user interfaces illustrated in FIGS. 3 to 29 show three panes in the dock area, implementations are not limited to this specific predetermined number. In some implementations, the predetermined number may be dependent on display orientation, e.g., with more panes showing in the dock area when the device is in landscape mode than when the device is in portrait mode.

Figure 30:
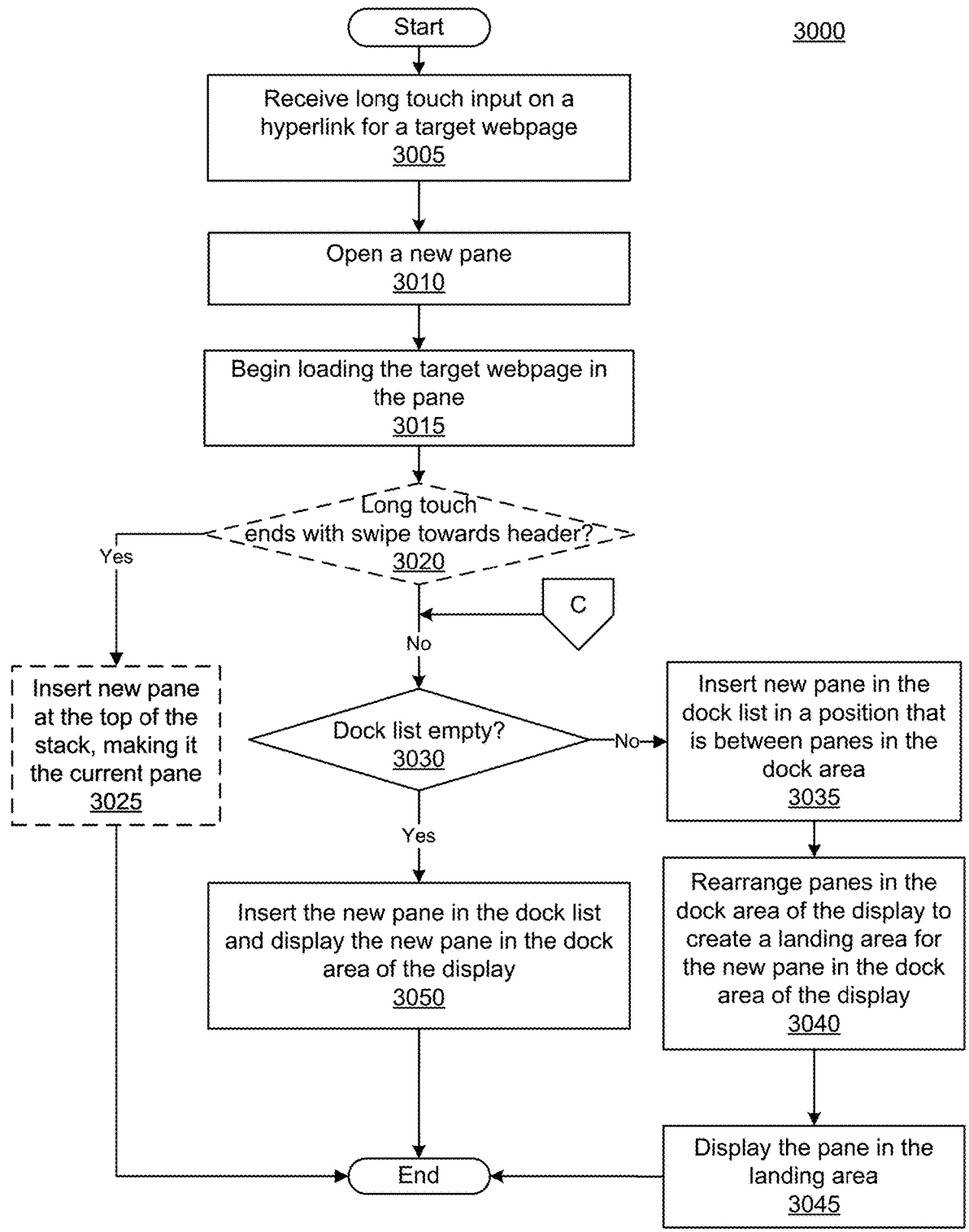
FIG. 30 illustrates a flow diagram of an example process for opening a new active pane in a dock, in accordance with disclosed implementations.

FIG. 30 illustrates a flow diagram of an example process 3000 for opening a new active pane, in accordance with disclosed implementations. Process 3000 may be performed by a mobile device, such as mobile device 100 of FIG. 1, executing a multi-view manager, such as multi-view manager 210 of FIG. 2. A mobile device executing the multi-view manager may be referred to herein as the system. Process 3000 may be used to open new panes in a multi-view environment. The panes of a multi-view environment can be active, i.e., load and update content in parallel with each other. Process 3000 occurs once for each long press of a navigation control in a current pane. Process 3000 may begin in response to receiving a long touch input on a navigation control, such as a hyperlink (3005). Navigation controls are used to enable the user to navigate from one view to another. For example, a hyperlink navigates to a target web page. In response to receiving the long press touch on the navigation control, the system opens a new pane 3010. The pane is a user interface element that displays content associated with the target location. The pane may be associated with several different properties, such as a state (maximized, minimized, draggable, etc.), a content location (e.g., deep link, URL, file path and name, query, etc.), various flags, etc. The system may begin loading the content of the target into the pane (3015). In some implementations, the pane may include a progress indicator that reflects the progress of loading the content.

In some implementations, a new pane is opened in the dock by default. In some implementations, the user may override this default by performing a swipe towards the header after the long touch input. For example, the user may perform the long touch and then, before releasing the touch, move the touching implement in a direction towards the header, e.g., up. If the system does determine that the user performed the swipe (3020, Yes), the system may insert the new pane in the stack list at the top of the stack, making the new pane the current pane (3025). The new pane would be given a maximized state. The current pane is the only pane in the stack with visible content. In some implementations, the system may animate the pane to the maximized state, e.g., enlarging the pane as it loads until it reaches the maximized state. Process 3000 then ends.

In some implementations, step 3020 is optional and may not be performed. If not performed, or if the user does not provide the swipe towards the header (3020, No), panes are automatically opened in the dock. In some implementations, the system may determine whether the dock list is empty (3030). The dock list is a list of panes in a minimized state. The dock list can include more panes than the number of panes visible in the dock area of the display. The dock list is empty when no panes are currently in a minimized state. If the dock list is empty (3030, Yes), the system inserts the new pane into the dock list and displays the new pane in the dock area of the display (3050). The dock area of the display is proximate a footer. The footer location can defined by the mobile application currently running. The footer is generally on an opposite of the header. Process 3000 then ends.

If the dock list is not empty (3030, No), the system inserts may insert the new pane into the dock list in a position that is between in the panes in the dock area (3035). When there are an odd number of panes in the dock area the system may choose a position that minimizes the rearranging of panes. The system also rearranges the panes in the dock area of the display to create a landing area for the new pane (3040). Rearranging may cause at least one other pane displayed in the dock area to shift, e.g., to the left or to the right. Rearranging may cause at least one other pane displayed in the dock area to move off display. The landing area is a space large enough to hold a pane in a minimized state. The system may display the pane in the landing area (3045). In some implementations, when opening a new pane, the system initially displays the new pane with a size that is smaller than the size of a pane in a minimized state. The new pane may thus appear to grow into the landing area. In some implementations, the system may open the pane outside the dock area and move the pane to the landing area as it grows to the size of a pane in the minimized state. In some implementations, the system may open the pane in the dock area and the pane may grow in size as the landing area grows. Process 3000 then ends. In some implementations (not shown), the system always inserts the new pane at a beginning or at an end of the dock list, rather than in the middle. Thus, in such implementations, some steps illustrated in process 3000 may be skipped or slightly modified from those shown.

Figure 31:
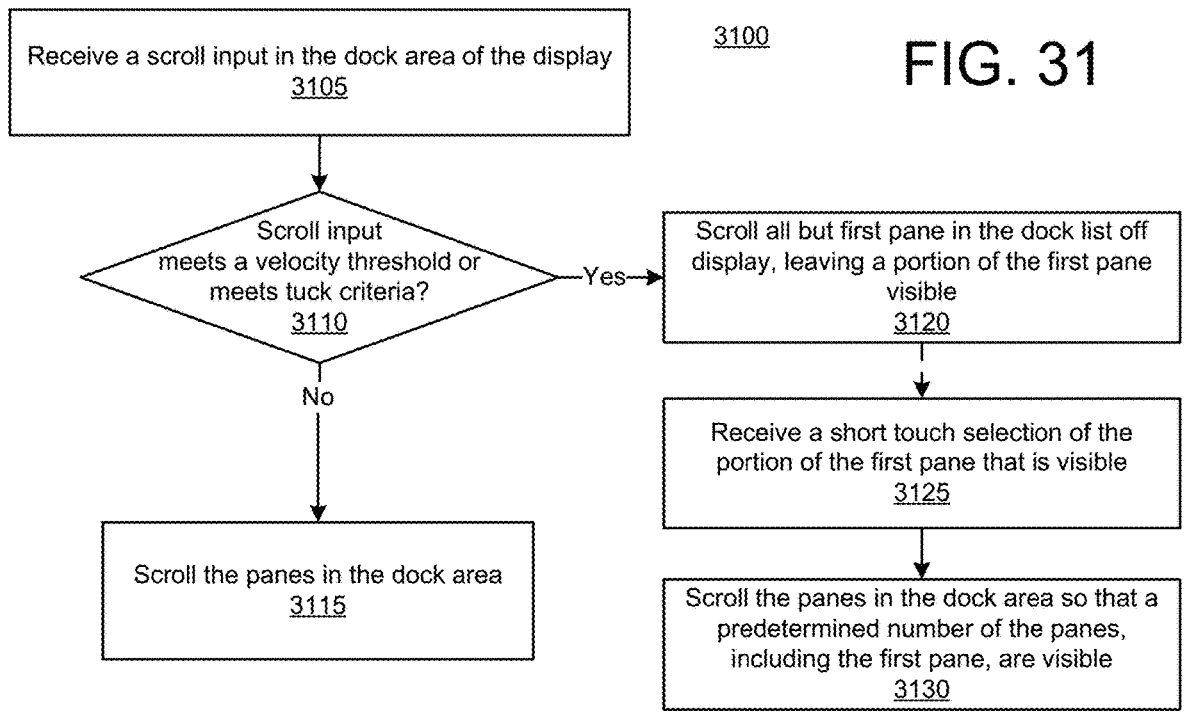
FIG. 31 illustrates a flow diagram of an example process for scrolling the dock, in accordance with disclosed implementations.

FIG. 31 illustrates a flow diagram of an example process 3100 for scrolling the dock, in accordance with disclosed implementations. Process 3100 may be performed by a mobile device, such as mobile device 100 of FIG. 1, executing a multi-view manager, such as multi-view manager 210 of FIG. 2. A mobile device executing the multi-view manager may be referred to as the system. Process 3100 may be used to scroll the panes that are in the dock area of the display, allowing panes that are off display to move into the display area. This may result in one or more panes that were previously displayed in the dock area to move off display. Process 3100 may also be used to tuck the panes, making more of the content of the current pane viewable. Process 3100 occurs once for each scroll input received in the dock area. Process 3100 may begin in response to receiving a scroll input in the dock area (3105). The scroll input for the dock area is in a direction parallel to the header. Thus, for a top/bottom arrangement for the header and optional footer, the scroll input will be in a general right or left direction. Likewise, for a left/right arrangement for the header and optional footer, the scroll input for the dock area will be in a general top or bottom direction. The scroll input has a length, e.g., representing the distance between the beginning touch and the release of the touch. The scroll input also has a duration and a velocity can be determined from the length and duration.

The system determines whether the scroll input meets a velocity threshold or meets tuck criteria. The tuck criteria may be based on a particular pane in the dock list being scrolled at least to a predetermined screen coordinate running perpendicular to the scroll direction. For example, if the scroll direction is left-right, the tuck criteria may be that the scroll results in a pane at the beginning (e.g., left-most) of the dock being scrolled at least to a particular x coordinate, e.g., running along the left or right edge of the display. For a scroll input to meet the tuck criteria, the user must scroll a the particular pane to or beyond this boundary. This, in effect scrolls the panes in the dock list past a tuck boundary. Some implementations may have one set of tuck criteria. Thus, for example, the tuck criteria is only met scrolling in one direction but not the other. Some implementations may have two tuck criteria. For example, a left boundary represented by a first x coordinate can be met when a last (right-most) pane in the dock list is scrolled to or past the left boundary, while a right boundary represented by a second x coordinate can be met with a first (left-most) pane in the dock list is scrolled to or past the right boundary. In such implementations, satisfying either condition satisfies the determination of 3110 and the dock can be tucked on either side of the display. In some implementations, the scroll velocity threshold only applies to a scroll in one direction. For example, the velocity threshold criteria may be applied only if the direction of the scroll input is to the left but not to a scroll direction to the right. In some implementations, the scroll velocity threshold is applied to either direction. In such an implementation, the dock can be tucked on either side of the display.

If the scroll input fails to meet the velocity threshold and fails to meet the tuck criteria (3110, No), the system scrolls the panes in the dock area in the direction of the scroll input (3115). Such scrolling is performed using conventional methods. If the scroll input meets the velocity threshold or meets a tuck criteria (3110, Yes), the system scrolls all but one pane in the dock list off display and leaves a portion of the one pane visible on the display (3120). The one pane that has a portion visible is either the first pane or the last pane in the dock list, depending on the direction of the scroll input. For example, on a scroll left, the first pane is the pane that has a portion visible. The size of the visible portion is less than 100% of the pane. For example, the portion may be one half or less of the pane, although implementations include portions of greater size. Once all panes in the dock list are off display except for a portion of one of the panes, the dock is referred to as tucked. When the dock is tucked, the user can see more of the content of the current pane. In some implementations, panes in the dock list that are off display are not active, i.e., do not update. In some implementations, one or more panes that are off display may be active. The dock remains tucked until the user provides a selection of the portion of the one pane that is visible (3125). The selection can be a short touch input on the portion that is visible or a scroll input that begins on the portion that is visible. In response to this input, the system scrolls the panes in the dock list to the dock area (3130). The dock area may only display a predetermined number of the panes. In such an implementation, the system only scrolls up to the predetermined number of panes in the dock list to the dock area; the remainder of the panes in the dock area (if any) remain off display. Process 3100 then ends.

Figure 32:
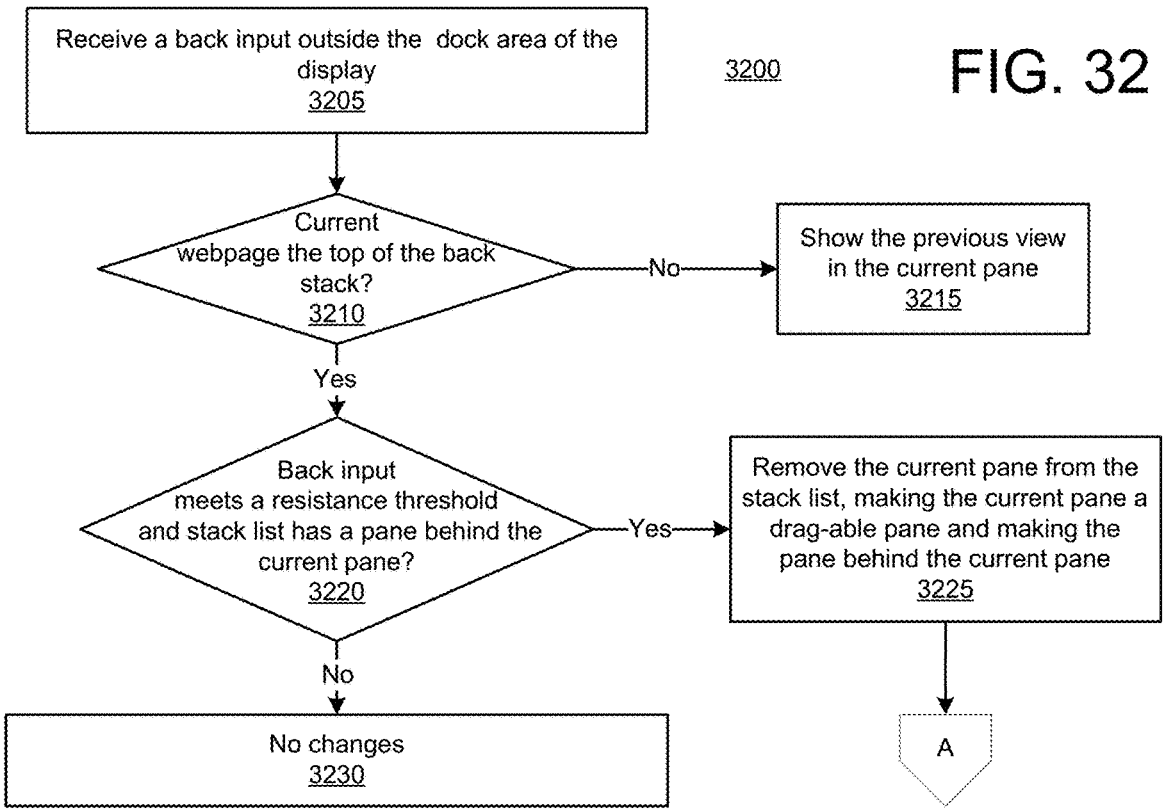
FIG. 32 illustrates a flow diagram of an example process for navigating a back stack in a multi-view environment, in accordance with disclosed implementations.

FIG. 32 illustrates a flow diagram of an example process 3200 for navigating a back stack in a multi-view environment, in accordance with disclosed implementations. Process 3200 may be performed by a mobile device, such as mobile device 100 of FIG. 1, executing a multi-view manager, such as multi-view manager 210 of FIG. 2. A mobile device executing the multi-view manager may be referred to as the system. Process 3200 may be used to navigate a back stack of a pane, for panes that have an associated back stack. The back stack may be a property of a pane. Not all panes may have a back stack. A back stack tracks the navigation path of a user, e.g., tracking the locations (e.g., links, documents, interfaces) a user has visited so that the user can walk back the navigation path. The back stack operates as a first-in-first-out manner, so that each back input removes the most recent place from the back stack and takes the user back to that location. Process 3200 may begin in response to receiving a back input outside the dock area (3205). A back input is an input identified by the mobile application as a request to traverse the back stack. In some implementations the back input is a swipe left. In some implementations, the back input is a "back" navigation area. In response to receiving the back input, the system determines whether the content for the current pane is the top of the back stack (3210). In some implementations, when the back stack has no entries, the current pane is the top of the back stack. In some implementations, when the back stack has one entry, and the entry matches the location associated with the current pane, the current pane is the top of the back stack. When the current pane is not the top of the back stack (3210, No), the system pops the location at the top of the back stack and causes the current pane to load the content associated with the location (3215). This represents conventional behavior for a back input. Process 3200 then ends. If the current pane is the top of the back stack (3210, Yes), the system determines whether the back input meets a resistance threshold and whether the stack list has includes a pane in addition to the current pane (3220). The two conditions may be tested independently and in any order. In some implementations the resistance threshold condition is an optional condition. A resistance threshold is a threshold that ensures the back input is done with sufficient distance, velocity, or some combination of these. The resistance threshold ensures that the user does not accidently initiate a dragging state on the current pane. If the current pane is the only pane in the stack list or if the back input fails to meet the resistance threshold (3220, No), the system continues to show the current pane (3230). In other words, no changes are made to the state of the current pane or the content displayed in the current pane. If the back input does meet the resistance threshold and if the stack list has at least one other pane (3220, Yes), the system tears the current pane off the stack, making it enter a draggable state (3225). Tearing (dislodging) the pane off the stack removes the pane from the stack list and makes the next pane in the stack list the current pane. The draggable pane is then the object of a drag input, and process 3200 moves to step 3310 or 3315 of FIG. 33, where the drag state manager handles the drag operation initiated by step 3225.

FIG. 33 illustrates a flow diagram of an example process 3300 for managing drag inputs in a multi-view environment, in accordance with disclosed implementations. Process 3300 may be performed by a mobile device, such as mobile device 100 of FIG. 1, executing a multi-view manager, such as multi-view manager 210 of FIG. 2. A mobile device executing the multi-view manager may be referred to as the system. Process 3300 manages the elements of a multi-view display during a drag input and determines the result of the drag input once the drag input is complete. The result of the drag input may be based on attributes of the release, such as the location of the release, velocity of the drag before the release, proximity to actionable areas, etc. Process 3300 may also be referred to as a drag state manager. Process 3300 may be activated by the initiation of a drag input and lasts as long as the drag input is active, e.g., until the particular drag input is released. Process 3300 begins in response to the initiation of a drag input of a first pane in the dock area of the display (3305). The initiation of a drag input may also be referred to as a receipt of a drag input. The drag input may be initiated by a touch input (short or long) that includes a directional component away from or towards the header. For the purposes of process 3300 the pane that is the object of a drag input is referred to as the first pane. Thus, for example, if process 3300 is invoked by some other action, such as an overscroll of the current pane as described in FIG. 38, or the back input tear off described in FIG. 32, the first pane refers to the pane that was removed from the stack and therefore entered a dragging state.

In some implementations, the system may display a footer with contextual actions in response to a pane entering a drag state (3310). The footer may be similar to footer 1010 of FIG. 10 or 2910 of FIG. 29. The footer may cover or replace a footer otherwise provided by the mobile application that is currently executing. If the mobile application has not footer, the footer may cover a portion of the dock area. The system may monitor the drag input before the release is received (3315, No). As part of monitoring the drag input, the system receives movements occurring during the drag. In response to the movements, the system scales the first pane (3320). The scale factor can be dependent on a distance from the dock area, proximity to a header, proximity to a maximization threshold, etc. As a pane moves away from the dock area and towards the header, the pane scales up. This enables the pane to grow, making the content more readable, as the user moves the pane toward the header. In some implementations, the system may scale the pane down with any movement that results in the pane moving from the dock area toward the footer; such scaling may shrink the pane smaller than the size of a pane in the minimized state. The scale factor may never cause the pane to reach the size of a maximized pane. The system redraws the pane at the new scale on the display.

The system also rearranges the panes in the dock area as needed (3325). For example, if the first pane leaves the dock area, the system may move a pane in the dock list into the area previously occupied by the first pane. This may allow panes that had been off display to be moved into the dock area. In some implementations, if the pane that is moved into the dock area is not active the content is refreshed as it moves into the dock area. As another example, if the user brings the first pane into the dock area, the system may make room (e.g., create a landing area) for the first pane in the dock area. This may cause one or more panes to be moved off display. Steps 3320 and 3325 occur often enough that the scaling may appear smooth to the user.

Once a release is received (3315, Yes), the system makes a series of decisions to determine the outcome of the drag input. The decisions can be performed in any order and implementations are not limited to the specific order illustrated in FIG. 33. As illustrated below, the decisions are based on attributes of the release. As a first decision, in implementations that provide the footer with contextual actions (step 3310), the system may determine whether the release occurs over a contextual action (3330). In some implementations, the release may occur over the contextual action when any part of the pane overlaps with the actionable area for the action. In some implementations, the release may occur over the contextual action when a particular portion of the pane overlaps with the actionable area for the action. In some implementations, the release occurs over the contextual action when the pane is within a pre-defined proximity of the actionable area. If the release does occur over a contextual action (3330, Yes), the system may perform the action on the first pane (3335). The contextual actions can include any action that could be performed on a view, such as closing a pane, saving a location for the pane in a favorites or bookmarks list, sharing the location of the pane, sending the content of a pane to a printer, reloading the content, translating the content, etc.

As another decision, some implementations, may determine whether the drag input release occurs on a close boundary (3327). In some implementations, such as the one described in FIGS. 19 and 20, moving a pane from the dock area towards the footer may close the pane if the drag input is released there. The system may use the close boundary to determine when the user has dragged the pane close enough to the footer to interpret the release as an instruction to close the pane. In implementations checking for proximity to a close boundary, if the release does occur proximate the close boundary (3337, Yes), processing continues as outlined in FIG. 34. In some implementations (not shown), this determination can be made during the drag input and before the release. In other words, in some implementations the proximity to the close boundary may be checked during the drag input and if the user brings the pane close enough to the close boundary the pane may be automatically closed even without a release. In some implementations, the pane may be animated to show the closing, e.g., the system may shrink the pane as it moves closer to the footer.

As another decision, the system may also determine whether a velocity of the drag input meets a velocity threshold (3340). The velocity of the drag input may be determined by a distance of the drag over some predefined time period. For example, the time period may be defined as the time occurring between two recognized gesture events. Thus, for example, a user may drag a pane around the display for ten second and then flick/throw the pane toward the header. The velocity is determined by some predefined time period so that the flick can be identified as the last intent of the user. If the velocity of the drag input does meet the velocity threshold (3340, Yes), the system may determine a direction of drag input (3355). This direction may be referred to as a velocity direction and may be determined by the length of the drag input used to determine the velocity. If the velocity direction is generally toward the dock area (3355, Yes), the system returns the pane to the dock area and adds it back to the dock list, scaling the pane down as it moves toward the dock area (3350). The system may rearrange the panes in the dock area, if needed, to create a landing area for the pane, as described with regard to steps 3035 to 3045 of FIG. 30. Process 3300 then ends. If the velocity direction is generally away from the header (3355, No), the system adds the pane to the stack list, makes it the current pane, and scales the pane up as it moves to the maximized state (3360). The system may also rearrange the panes in the dock area, if needed, to eliminate the space previously occupied by the pane.

If the velocity of the drag input does not meet the velocity threshold (3340, No), the system may determine whether the release location meets the maximization threshold (3345). The maximization threshold occurs between the dock area and the header. In some implementations the maximization threshold is closer to the header than the dock area. In some implementations, the release meets the maximization threshold when any portion of the pane crosses the threshold. In some implementations, the release meets the maximization threshold when a predetermined portion of the pane crosses the threshold. If the release fails to meet the maximization threshold (3345, No), the system returns the pane to the dock area and adds it back to the dock list, scaling the pane down as it moves toward the dock area (3350). The system may rearrange the panes in the dock area, if needed, to create a landing area for the pane. Process 3300 then ends. If the release meets the maximization threshold (3345, Yes), the system adds the pane to the stack list, makes it the current pane, and scales the pane up as it moves to the maximized state (3360). Process 3300 then ends. With regard to a drag input, a drag input need not be of a long duration. For example, a short touch followed by a short but quick drag in a direction perpendicular to the scrolling direction of the dock may be interpreted as a drag input on a pane in the dock. Because of the short duration and distance of such a drag input, the velocity threshold is likely to be met. Thus, a user can flick or throw a pane from the dock to the stack via process 3300.

FIG. 34 illustrates a flow diagram of an example process 3400 for closing a pane in the dock, in accordance with disclosed implementations. Process 3400 may be performed when a drag input reaches a close boundary, e.g., as described with regard to step 3327 of FIG. 33. Process 3400 begins by closing the pane, which releases any resources associated with the pane (3405). In some implementations, the system may add the location associated with the now closed pane to a list of recent locations (3410). This may facilitate the user finding the location again if the pane is closed in error. If needed, the system may then scroll the remaining panes in the dock, if any, to fill the space previously occupied by the closed pane (3415). In some implementations, the system may always show a predetermined number of panes in the dock area when at least that many panes are in the dock list. Process 3400 then ends.

FIG. 35 illustrates a flow diagram of an example process 3500 for switching the current pane displayed in a multi-view environment, in accordance with disclosed implementations. Process 3500 may be performed by a mobile device, such as mobile device 100 of FIG. 1, executing a multi-view manager, such as multi-view manager 210 of FIG. 2. A mobile device executing the multi-view manager may be referred to as the system. Process 3500 enables a user to quickly rotate through the panes in the stack without having to navigate to a separate tab-switching interface. Process 3500 begins in response to a short touch input of the stack selection area (3505). The stack selection area is an actionable area of the display that provides an indication that the stack list includes more than one pane. An example stack selection area 1105 is illustrated in FIGS. 11-17. In response to the short touch input on the stack selection area, the system may move the current pane to the back of the stack list (3510) and make the next pane in the stack list the current pane (3515). Each time the user provides a short touch input in the stack selection area, the system performs process 3500, enabling the user to quickly rotate the current pane, which makes comparison of the content faster and easier.

FIG. 36 illustrates a flow diagram of an example process 3600 for cloning a current pane in a multi-view environment, in accordance with disclosed implementations. Process 3600 may be performed by a mobile device, such as mobile device 100 of FIG. 1, executing a multi-view manager, such as multi-view manager 210 of FIG. 2. A mobile device executing the multi-view manager may be referred to as the system. Process 3600 enables a user to quickly and easily open multiple copies of a source view at different scroll locations so that comparisons can more easily be made. For example, when using a shopping application, a user may activate the clone control each time the user sees an item the user likes as the user scrolls through the content displayed in the current pane. Each cloned pane is added to the dock list, where it can be viewed later. Each pane is independent of the others, e.g., can scroll, update, and be navigated independently. The user can easily drag panes from the dock to do comparisons of the information in each pane. Process 3600 begins in response to a short touch input of the clone control (3605). An example of a clone control 330 is illustrated in FIGS. 3 to 15, although implementations are not limited to the specific icon illustrated. In response to the short touch input on the clone control, the system opens a new pane (3610). The new pane is associated with the same content as the current pane, e.g., the same web page, the same deep link, the same document, etc. The new pane is also given the same scroll offset that the current pane has. The system begins loading this content, at the scroll offset in the new pane (3615). Processing then continues as for other new panes, at outlined at step 3030 of FIG. 30, and then process 3600 ends.

Figure 37:
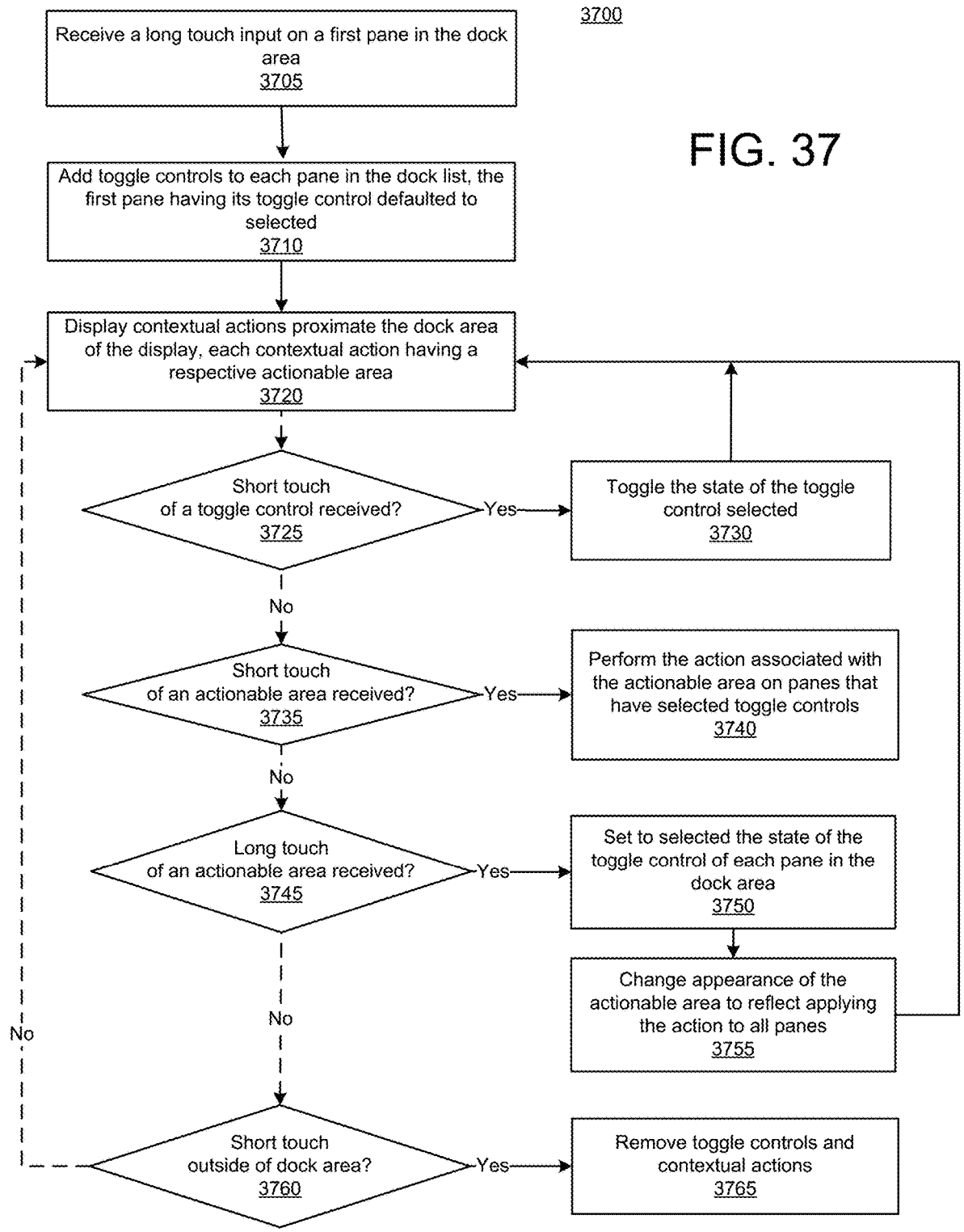
FIG. 37 illustrates a flow diagram of an example process for performing contextual actions on panes in the dock using toggle controls, in accordance with disclosed implementations.

FIG. 37 illustrates a flow diagram of an example process for performing contextual actions on panes in the dock using toggle controls, in accordance with disclosed implementations. Process 3700 may be performed by a mobile device, such as mobile device 100 of FIG. 1, executing a multi-view manager, such as multi-view manager 210 of FIG. 2. A mobile device executing the multi-view manager may be referred to as the system. Process 3700 enables a user to perform actions on one or more of the panes in the dock without having to navigate to a separate user interface. Process 3700 begins in response to a long touch input of a pane in the dock area of the display (3705). In response to the long touch input of the pane in the dock area of the display, the system adds a toggle control to each pane in the dock list (3710). A toggle control conventionally has two states; an unselected state and a selected state. In some implementations, the pane that was the object of the long touch input may have the state of its respective toggle control default to selected. The system may also display one or more contextual actions proximate to the dock area of the display (3720). The contextual actions may each be associated with an actionable area. The actionable area is capable of being selected, e.g., by a touch input. The actionable area may be associated with an icon. The contextual actions may be proximate a top of the dock area, as illustrated in FIG. 21. The contextual actions may be proximate a bottom of the dock area. The system may then respond to one of several events. While the events are listed as a decision flow in FIG. 37 for ease of discussion, the events are triggered by the touch inputs and are not dependent on each other. Thus, for example, a short touch outside of the dock area may trigger the affirmative action (3755, Yes) without the system actually performing the other listed determinations. When a short touch of a toggle control is received (3725, Yes), the system toggles the state of the selected control (3730). The system then waits for the next touch input. The state of a toggle control is either selected or unselected. When a short touch of an actionable area is received (3735, Yes), the system performs the action associated with the selected actionable area on the panes in the dock list that have a respective toggle control with a selected state (3740). Thus, for example, a user can close two of three panes showing in the dock area. Although not explicitly illustrated in FIG. 37 as an event, implementations enable a user to scroll the dock to select panes that are not displayed in the dock area, if any such panes exist. Thus, for example, a user may scroll the dock and then provide a short touch of a toggle control for a pane that was previously off display as part of process 3700. Process 3700 then ends.

Figure 22:
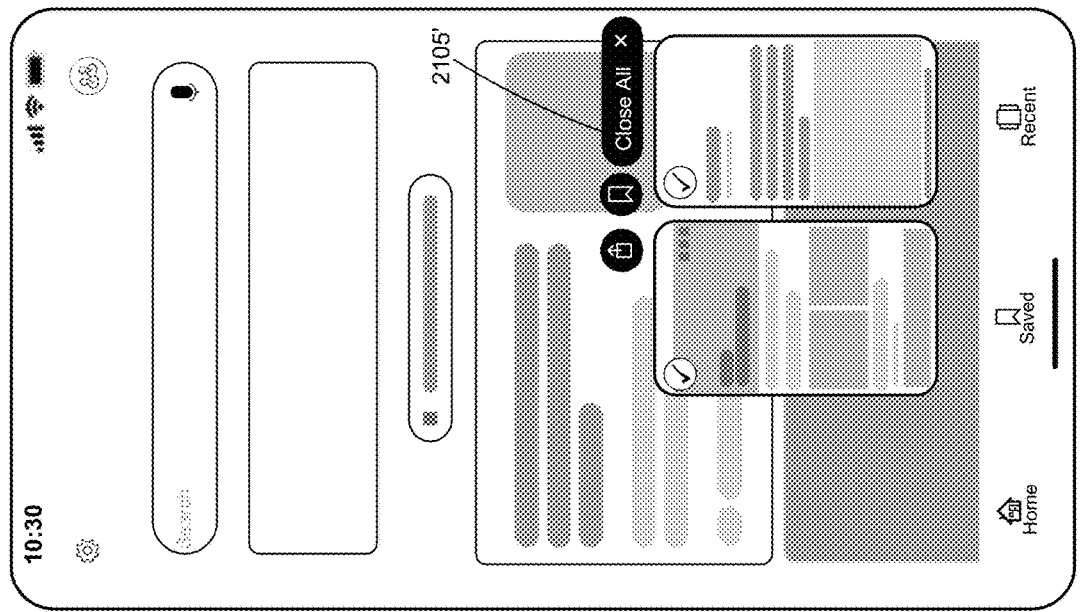
FIG. 22 illustrates an example interface for performing a contextual action on all panes in the dock area of a display, in accordance with some implementations.

When the system receives a long touch of an actionable area (3754, Yes), the system may set the state of each toggle control to selected (3750). In some implementations, the system may also change the appearance of the actionable area that was selected (3755). For example, the system may make the actionable area larger and may provide an indication that the action applies to all panes in the dock. FIG. 22 illustrates an example of the changed actionable area 2105'. The system then waits for the next input. When a short touch input is received outside of the dock area and not on one of the actionable areas (3760, Yes), the system may remove the toggle controls and the contextual actions from the display (3765). This, in effect, cancels the actions and ends process 3700.

Figure 38:
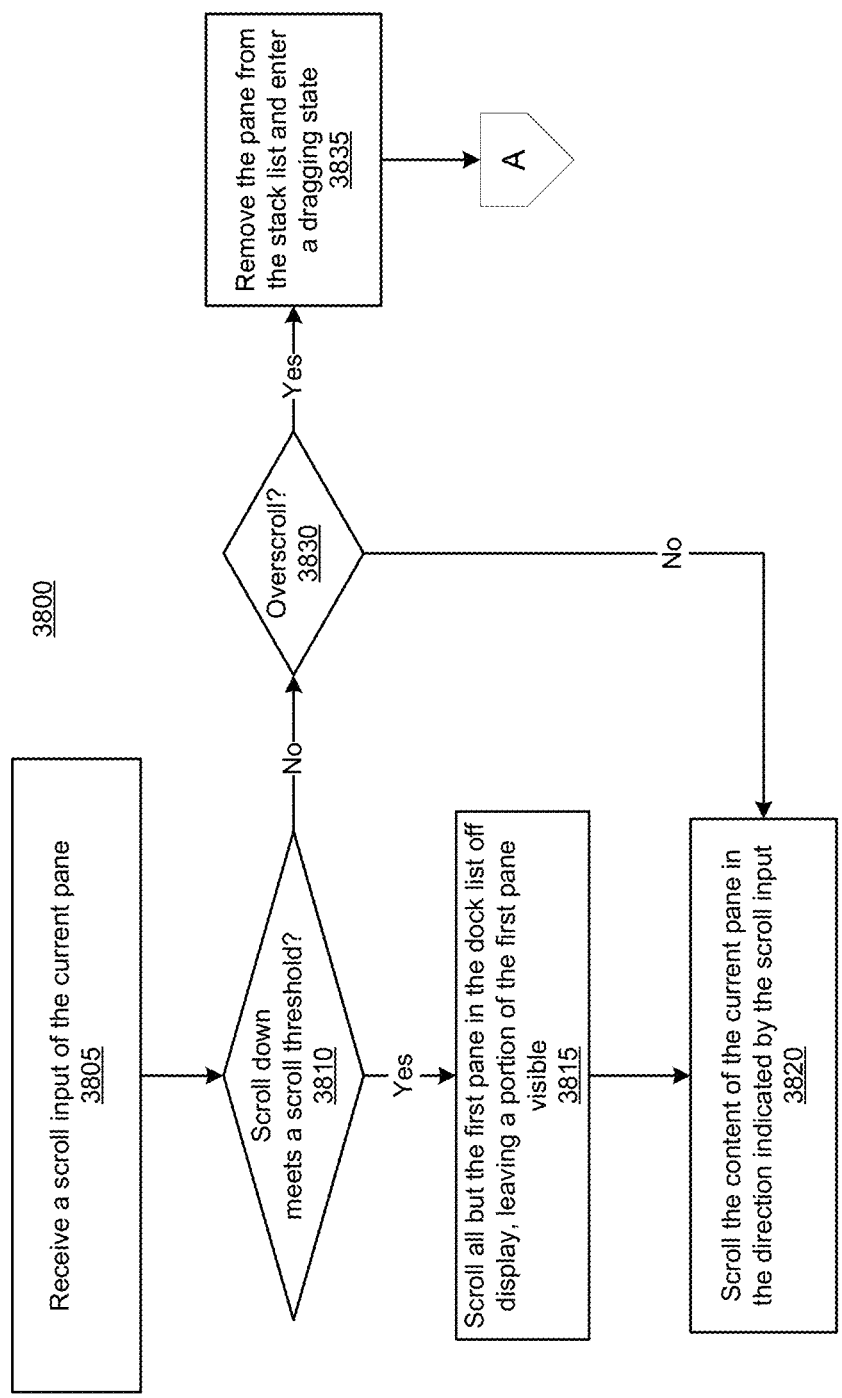
FIG. 38 illustrates a flow diagram of an example process for scrolling content in the current pane, in accordance with disclosed implementations.

FIG. 38 illustrates a flow diagram of an example process 3800 for scrolling content in the current pane, in accordance with disclosed implementations. Process 3800 may be performed by a mobile device, such as mobile device 100 of FIG. 1, executing a multi-view manager, such as multi-view manager 210 of FIG. 2. A mobile device executing the multi-view manager may be referred to as the system. Process 3800 automatically tucks the dock, which enables a user to view more content in the current pane without having to expressly move the dock out of the way. In some implementations, process 3800 can also enable a user to tear the current pane off the stack by scrolling. Process 3800 begins in response to a scroll input for the content of a current pane (3805). The scroll input has a direction component, either towards the header or away from the header. A scroll input in a direction towards the header scrolls the content of the pane towards the end of the content. A scroll input in a direction away from the header scrolls the content of the pane towards the beginning of the content.

The system may determine whether the scroll input is a scroll towards the header that meets a scroll threshold (3810). The scroll threshold may be a condition that indicates an amount of content the user wants to scroll. A scroll input that meets the velocity threshold may automatically meet the scroll threshold. However, the scroll threshold may be lower than the velocity threshold so that, for example, a slower, longer scroll could meet the scroll threshold. If this scroll condition is not met (3810, No), the system determines whether the scroll input is an overscroll (3830). An overscroll occurs when the user is already at the beginning of the content and performs a scroll away from the header, i.e., towards the beginning of the content. Because the user is already at the beginning, there is nothing else to show in response to the scroll input. In some implementations, the scroll input must also meet a resistance threshold to meet the overscroll conditions. In some implementations, if the current pane is the only pane in the stack, or if the current pane is a host pane, the overscroll condition is not met. If the overscroll condition(s) are met (3830, Yes), the current pane is removed from the stack and enters a dragging state (3835). The pane is then the object of a drag input and the process continues at step 3310 or 3315 of FIG. 33. If the overscroll condition(s) are not met (3830, No), the system scrolls the content of the current pane in the direction indicated by the scroll input (3820).

If this scroll condition is met (3810, Yes), the system tucks the dock, scrolling all but one pane off display and leaving only a portion of the one pane visible in the dock area (3815), as described above with regard to step 3120 of FIG. 31. The dock can be untucked, e.g., in response to a short touch as described by steps 3125 and 3130 of FIG. 31. The system may then scroll the content of the current pane in the direction indicated by the scroll input (3820) and process 3800 ends.

Figure 39:
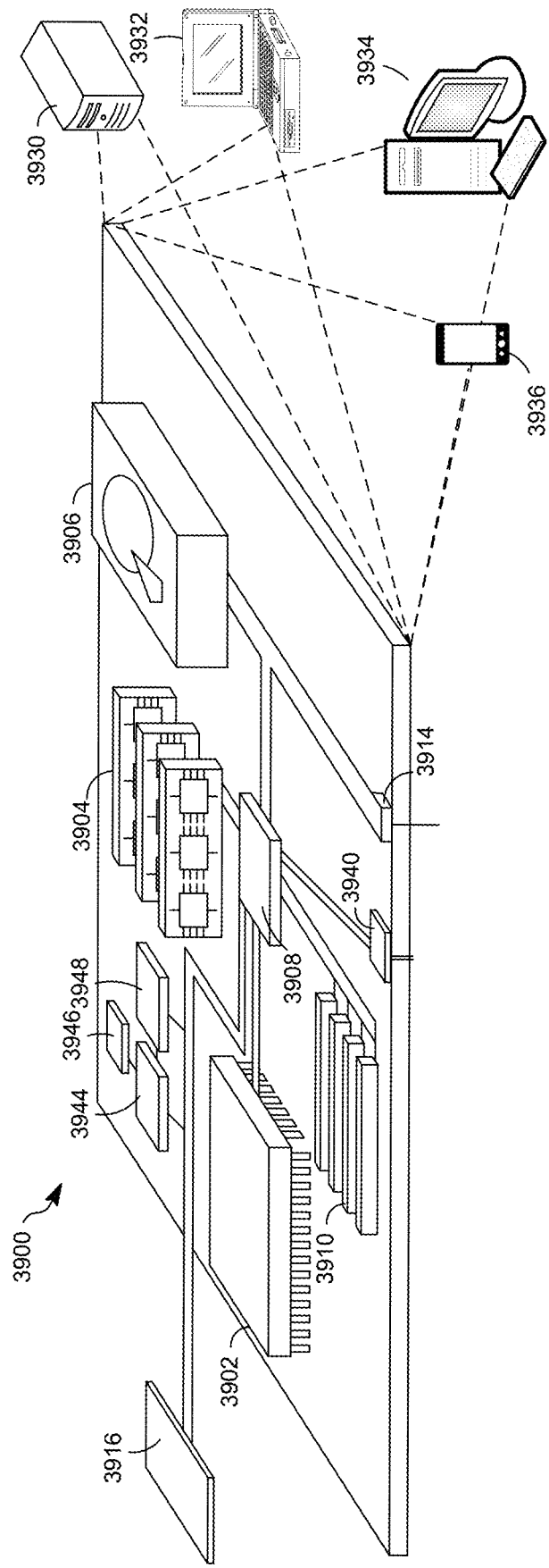
FIG. 39 shows an example of a computer device that can be used to implement the described techniques.

FIG. 39 shows an example of a generic computer device 3900, which may be operated as mobile device 100 of FIG. 1, which may be used with the techniques described here. Computing device 3900 is intended to represent various example forms of mobile devices, such as smart phones, tables, foldable phones, watches, personal digital assistants, glasses, in-vehicle displays, or any other computing device with limited display area. The components shown here, their connections and relationships, and their functions, are meant to be examples only, and are not meant to limit implementations of the inventions described and/or claimed in this document.

Computing device 3900 includes a processor 3902, memory 3904, a storage device 3906, and expansion ports 3910 connected via an interface 3908. In some implementations, computing device 3900 may include transceiver 3946, communication interface 3944, and a GPS (Global Positioning System) receiver module 3948, among other components, connected via interface 3908. Device 3900 may communicate wirelessly through communication interface 3944, which may include digital signal processing circuitry where necessary. Each of the components 3902, 3904, 3906, 3908, 3910, 3940, 3944, 3946, and 3948 may be mounted on a common motherboard or in other manners as appropriate.

The processor 3902 can process instructions for execution within the computing device 3900, including instructions stored in the memory 3904 or on the storage device 3906 to display graphical information for a GUI on an external input/output device, such as display 3916. Display 3916 may be a monitor or a flat touchscreen display. In some implementations, multiple processors and/or multiple buses may be used, as appropriate, along with multiple memories and types of memory. Also, multiple computing devices 3900 may be connected, with each device providing portions of the necessary operations (e.g., as a server bank, a group of blade servers, or a multi-processor system).

The memory 3904 stores information within the computing device 3900. In one implementation, the memory 3904 is a volatile memory unit or units. In another implementation, the memory 3904 is a non-volatile memory unit or units. The memory 3904 may also be another form of computer-readable medium, such as a magnetic or optical disk, memory card, flash, cache, etc. In some implementations, the memory 3904 may include expansion memory provided through an expansion interface.

The storage device 3906 is capable of providing mass storage for the computing device 3900. In one implementation, the storage device 3906 may be or include a computer-readable medium, such as a removable memory card, a hard disk device, an optical disk device, a flash memory or other similar solid state memory device, or an array of devices. A computer program product can be tangibly embodied in such a computer-readable medium or in memory 3904. The computer program product may also include instructions that, when executed, perform one or more methods, such as those described above. The computer- or machine-readable medium is a storage device such as the memory 3904, the storage device 3906, or memory on processor 3902.

The interface 3908 may be a high speed controller that manages bandwidth-intensive operations for the computing device 3900 or a low speed controller that manages lower bandwidth-intensive operations, or a combination of such controllers. An external interface 3940 may be provided so as to enable near area communication of device 3900 with other devices. In some implementations, controller 3908 may be coupled to storage device 3906 and expansion port 3914. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter. The computing device 3900 may include a number of input devices, such as a camera or multiple cameras, a gyroscope, a temperature sensor, a microphone, etc., for capturing input.

The computing device 3900 may be implemented in a number of different forms, as shown in the figure. For example, it may be implemented as a standard server 3930, or multiple times in a group of such servers. It may also be implemented as part of a rack server system. In addition, it may be implemented in a computing device, such as a laptop computer 3932, personal computer 3934, or tablet/smart phone 3936. An entire system may be made up of multiple computing devices 3900 communicating with each other. Other configurations are possible.

According to one aspect, a method for providing a user interface includes displaying a current pane of a stack list. The stack list includes a list of panes in a maximized state. A maximized state represents a largest size of the pane, a pane being a resizable container for displaying content associated with a location, and a pane at a top of the stack list is the current pane. The method may also include displaying, in a dock area of the user interface, at most a predetermined number of panes in a dock list. The dock list includes a list of panes in a minimized state, a minimized state of a pane being a scaled-down version of the content displayed in the pane in the maximized state, and remaining panes in the dock list are off display. Responsive to receiving a long touch input on a navigation control in the content of the current pane, the method also includes adding a new pane to the dock list, the new pane being associated with a target location of the navigation control.

These and other aspects can include one or more of the following features, alone or in combination. For example, the content of the current pane hides the content of remaining panes in the stack list. As another example, adding the new pane to the dock list can include adding the new pane to the dock list in a position that results in the new pane being one of the predetermined number of panes displayed in the dock area and arranging the display of the panes in the dock area to match the order of the panes in the dock list. In some implementations, arranging the display of the panes includes scrolling at least one of the predetermined number of panes off display. As another example, the user interface may include a stack selection area and the method may further include receiving a short touch input on the stack selection area and responsive to receiving the short touch input on the stack selection area, moving the current pane to the back of the stack list, and making a next pane in the stack list the current pane, wherein the content of the current pane becomes visible. As another example, panes in the dock list load and update in parallel.

As another example, the current pane may display a beginning of the content and the method further includes receiving a scroll input in a direction away from a header of the user interface, the scroll input being in an area outside the dock area and exceeding a resistance threshold, and responsive to receiving the scroll input in the direction away from the header, moving the current pane to a draggable state and removing the current pane from the stack list, and making a next pane in the stack list the current pane, wherein the pane in a draggable state has a smaller scale than the maximized state and makes the pane an object of a drag input. In some such implementations, the method may also include receiving a release of the drag input, determining a location of the release, responsive to determining the location meets a maximization threshold, adding the pane in the draggable state back to the stack list, and making the pane the current pane, and responsive to determining the location fails to meet the maximization threshold, adding the pane in the draggable state to the dock list and displaying the pane in a minimized state in the dock area. In some implementations, responsive to determining the location fails to meet the maximization threshold, the method may include moving two panes in the dock area away from each other to create a landing area and moving the pane in the draggable state to the landing area. In some implementations, the method may include receiving a release of the drag input, determining that a velocity of the drag input exceeds a velocity threshold, the drag input having a direction component, responsive to determining that the direction component is towards the dock area, adding the pane in the draggable state to the dock list and displaying the pane in a minimized state in the dock area, and responsive to determining that the direction component is away from the dock area, adding add the pane in the draggable state to the stack list, and making the pane the current pane. In some implementations, the method can include scaling a size of the pane in the draggable state according to proximity to the dock area, wherein as the pane in the draggable state approaches the dock area the size of the pane in the draggable state approaches the minimized state. As another example, the method can include displaying a footer with contextual actions during the drag input, each contextual action having a respective actionable area. In some implementations, the method may also include receiving a release of the drag input, the release wherein the first pane overlaps a first actionable area in the footer at the release and responsive to receiving the release, performing the action associated with the first actionable area on the draggable pane. In some implementations, at least one contextual action may be a close action and performing the close action includes removing the draggable pane from the dock list, removing the draggable pane from the user interface, and closing the draggable pane.

As another example, the method may also include receiving a long touch input of a first pane in the dock area and, responsive to receiving the long touch input of the first pane, displaying at least two contextual actions, each contextual action having a respective actionable area. In some implementations, the at least two contextual actions may be displayed in a footer. In some implementations, the method may also include receiving a short touch input of a respective actionable area and performing the action for the respective actionable area on the first pane. In some implementations, the method may also include, responsive to the long touch input of the first pane, adding a selection toggle control for each pane in the dock area, wherein the selection toggle control for the first pane defaults to a selected state. In some implementations, the method may also include receiving a selection of the toggle control for a second pane, which changes a state of the toggle control for the second pane to a selected state and, responsive to receiving a short touch input of a respective actionable area, performing the action on the first pane and the second pane. In some implementations, the method may also include receiving a long touch input on a first actionable area and, responsive to the long touch input on the first actionable area, setting each toggle control of each pane in the dock list to a selected state.

According to one aspect, a method includes displaying a current pane in a maximized state and at least a first pane in a minimized state in a dock area. The current pane is a top of a stack list and displays content associated with a first location and the first pane is in a dock list and displays content associated with a second location. The minimized state for a pane is a scaled down version of the maximized state for the pane, the scale applying to the content for the pane and a size of the pane. The method also includes receiving a drag input on the first pane in the dock area and scaling the size of the first pane according to proximity to the dock area. As the first pane approaches the dock area the size of the first pane approaches the minimized state. The method also includes receiving a release of the drag input and returning the first pane to a maximized state or a minimized state depending on attributes of the drag input.

These and other aspects include one or more of the following features, either alone or in combination. For example, a size of the minimized state may be expressed as a non-zero percentage of a size of the maximized state. As another example, the attributes may include location of the release and a velocity of the drag input. As another example, the dock list further includes at least a second pane and a third pane, the second pane and the third pane being displayed in the dock area, and the method further includes rearranging the second pane and the third pane in the dock area responsive to the first pane reaching the dock area or leaving the dock area. In some implementations, the dock list further includes at least a fourth pane and the method further comprises scrolling the fourth pane onto the dock area responsive to the first pane leaving the dock area. As another example, the method may also include determining that the first pane has reached a close boundary and, responsive to the determining, automatically closing the first pane and removing the first pane from the dock list. In some implementations, the method may also include adding the second location to a list of recent locations responsive to closing the first pane. As another example, the method may also include determining that a velocity of the drag input meets a velocity threshold, responsive to a direction of the drag input being toward the dock area, moving the first pane to the dock area, and, responsive to a direction of the drag input being away from the dock area, moving the first pane to the stack list, making the first pane the current pane and hiding the content associated with the first location. As another example, the method may include determining whether a location of the release meets a maximization threshold, responsive to the location failing to meet the maximization threshold, moving the first pane to the dock area, and responsive to the location meeting the maximization threshold, moving the first pane to the stack list, making the first pane the current pane and hiding the content associated with the first location. As another example, determining the location of the release may occur responsive to determining that a velocity of the drag input fails to meet a velocity threshold.

According to one aspect, a mobile device includes a display, at least one processor, and memory storing a stack list and a dock list. The stack list includes a list of panes in a maximized state, a maximized state representing a largest size of the pane, a pane being a resizable container for displaying active content, wherein a pane at a top of the stack list is a current pane. The dock list includes a list of panes in a minimized state in a dock area of the display, a minimized state for a pane being a smaller version of the content displayed in the maximized state for the pane. The mobile device also includes memory storing instructions that, when executed by the at least one processor, cause the mobile device to perform operations. The operations include displaying the content of the current pane of the stack list, the content of remaining panes in the stack list being hidden behind the current pane, and displaying the panes in the dock list in a dock area, wherein at most a predetermined number of panes in the dock list are displayed simultaneously and remaining panes in the dock list are off display. The operations also include, responsive to receiving a long touch input on a navigation control in the content of the current pane, generate a new pane, the new pane being associated with content for a target location of the navigation control and the new pane being added to the dock list and displayed in the dock area.

These and other aspects can include one or more of the following features, alone or in combination. For example, the stack list may include a home page, wherein the home page is not moveable to a draggable state or a minimized state. As another example, the operations may also include determining whether the long touch ends with a swipe, responsive to determining that the long touch ends with a swipe, adding the new pane to the stack list and making the new pane the current pane, and, responsive to determining that the long touch fails to end with a swipe, adding the new pane to the dock list. As another example, the operations may also include, responsive to the new pane being added to the dock list, rearranging the panes in the dock area to create a landing area for the new pane, wherein the new pane is displayed in the landing area. In some implementations, the operations may include displaying the new pane in a size smaller than the minimized state when it is generated, and scaling the new pane up to the minimized state to display the new pane in the landing area. In some implementations, the new pane may first be displayed outside the dock area. As another example, the content for the target location may begin loading in the new pane and finishes loading subsequent to being displayed in the dock area. In some implementations, the content for the target location continues loading after being scrolled to a new location in the dock area. As another example, each pane may have respective flag indicating whether the pane remains active off display. In some implementations, the flag indicating whether the pane remains active off display has a default value that indicates the pane does remain active. In some implementations, the operations may also include monitoring memory usage and, responsive to determining memory usage is outside a predetermined limit, changing the respective flag of a pane off display to a value indicating the pane does not remain active off display. In some implementations, the pane off display is a pane in the dock list. In some implementations, the pane off display is a pane in the stack list that is not the current pane. As another example, each pane may have a scroll offset attribute.

In one general aspect, a mobile device includes a display, at least one processor, a means for tracking panes of active content in a maximized state, a means for tracking panes of active content in a minimized state, a means for displaying at most a predetermined number of the panes in the minimized state, and a means for opening a new pane in a minimized state in response to a long press of a navigation control in a maximized pane, wherein a pane in a minimized state is a scrolled down version of the pane in a maximized state. In some implementations, the mobile device may include a scrolling means for the panes in the minimized state, the scrolling means tucking all but a first pane of the panes in the minimized state off display and leaving a portion of the first pane on display. The scrolling means may also change the panes in the minimized state that are included in the predetermined number of panes. The scrolling means may determine the properties, such as direction and velocity, of a scroll input. In some implementations, the mobile device may include a means for managing dragging behavior of a pane. In some implementations, the mobile device may include a means for providing contextual actions for one of the panes in the minimized state.

In one general aspect, a mobile device includes a display, at least one processor, and memory storing instructions that, when executed by the at least one processor, cause the mobile device to perform any of the methods disclosed herein.

In one general aspect, a computer program product embodied on a computer-readable storage device includes instructions that, when executed by at least one processor formed in a substrate, cause a computing device to perform any of the disclosed methods, operations, or processes. Another general aspect includes an apparatus (e.g., a computing device) configured to perform any of the disclosed methods, operations or processes. Another general aspect includes a system and/or a method for generating a user interface that performs substantially as shown in and/or described in connection with at least one of the figures, and as set forth more completely in the claims.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for providing a user interface, comprising:
    displaying a current pane of a stack list, the stack list including a list of panes in a maximized state, a pane being a resizable container for displaying content associated with a location, a maximized state representing a largest size of a pane, wherein a pane at a top of the stack list is the current pane;
    displaying, in a dock area of the user interface, at most a predetermined number of panes in a dock list, the dock list including a list of panes in a minimized state, a minimized state of a pane displaying an active view of a scaled-down version of the content displayed in the pane in the maximized state, wherein the dock area overlays the current pane and remaining panes in the dock list are off display; and
    responsive to receiving a long touch input lacking a distance component on a navigation control in the content of the current pane, adding a new pane to the dock list, the new pane being associated with a target location of the navigation control.

2. The method of claim 1, wherein the content of the current pane hides the content of remaining panes in the stack list.

3. The method of claim 1, wherein adding the new pane to the dock list includes:
    adding the new pane to the dock list in a position that results in the new pane being one of the predetermined number of panes displayed in the dock area; and
    arranging the display of the panes in the dock area to match an order of the panes in the dock list.

4. The method of claim 3, wherein arranging the display of the panes includes scrolling at least one of the predetermined number of panes off display.

5. The method of claim 1, wherein the user interface includes a stack selection area and the method further includes:
receiving a short touch input on the stack selection area; and
responsive to receiving the short touch input on the stack selection area, moving the current pane to the back of the stack list, and making a next pane in the stack list the current pane, wherein the content of the current pane becomes visible.

6. The method of claim 1, wherein the current pane displays a beginning of the content and the method further includes:
receiving a scroll input in a direction away from a header of the user interface, the scroll input being in an area outside the dock area and exceeding a resistance threshold; and
responsive to receiving the scroll input in the direction away from the header:
moving the current pane to a draggable state, wherein the pane in a draggable state has a smaller scale than the maximized state and makes the pane an object of a drag input, and
removing the current pane from the stack list, and making a next pane in the stack list the current pane.

7. The method of claim 6, further comprising:
receiving a release of the drag input;
determining a location of the release;
responsive to determining the location meets a maximization threshold, adding the pane in the draggable state back to the stack list, and making the pane the current pane; and
responsive to determining the location fails to meet the maximization threshold, adding the pane in the draggable state to the dock list and displaying the pane in a minimized state in the dock area.

8. The method of claim 7, further comprising, responsive to determining the location fails to meet the maximization threshold:
moving two panes in the dock area away from each other to create a landing area; and
moving the pane in the draggable state to the landing area.

9. The method of claim 6, further comprising:
receiving a release of the drag input;
determining that a velocity of the drag input exceeds a velocity threshold, the drag input having a direction component;
responsive to determining that the direction component is towards the dock area, adding the pane in the draggable state to the dock list and displaying the pane in a minimized state in the dock area; and
responsive to determining that the direction component is away from the dock area, adding add the pane in the draggable state to the stack list, and making the pane the current pane.

10. The method of claim 6, further comprising:
scaling a size of the pane in the draggable state according to proximity to the dock area, wherein as the pane in the draggable state approaches the dock area the size of the pane in the draggable state approaches the minimized state.

11. The method of claim 6, further comprising displaying a footer with contextual actions during the drag input, each contextual action having a respective actionable area.

12. The method of claim 11, further comprising:
receiving a release of the drag input, wherein the pane in the draggable state overlaps a first actionable area in the footer at the release; and
responsive to receiving the release, performing the contextual action associated with the first actionable area on the pane.

13. The method of claim 11, wherein at least one contextual action is a close action and performing the close action includes:
removing the pane in the draggable state from the dock list;
removing the pane from the user interface; and
closing the pane.

14. The method of claim 1, further comprising:
receiving a long touch input of a first pane in the dock area, the long touch input lacking a distance component; and
responsive to receiving the long touch input of the first pane, displaying at least two contextual actions, each contextual action having a respective actionable area.

15. The method of claim 1, wherein panes in the dock list load and update in parallel.

16. A method comprising:
displaying a current pane in a maximized state and at least a first pane in a minimized state in a dock area, wherein the current pane displays content associated with a first browser window and the first pane is in a dock list and displays content associated with a second browser window, wherein the minimized state for a pane is an active view of content scaled down from the maximized state for the pane, the scale applying to the content for the pane and a size of the pane;
receiving a drag input on the first pane in the dock area;
during the drag input on the first pane, scaling the size of the first pane proportionally to proximity to the dock area, wherein as the first pane approaches the dock area the size of the first pane approaches the minimized state;
receiving a release of the drag input; and
returning the first pane to a maximized state or a minimized state depending on attributes of the drag input.

17. The method of claim 16, wherein a size of the minimized state is expressed as a percentage of a size of the maximized state.

18. The method of claim 16, further comprising:
determining that the first pane has reached a close boundary; and
responsive to the determining, automatically closing the first pane and removing the first pane from the dock list.

19. The method of claim 18, further comprising:
adding a location associated with the second browser window to a list of recent locations responsive to closing the first pane.

20. The method of claim 16, further comprising:
determining that a velocity of the drag input meets a velocity threshold;
responsive to a direction of the drag input being toward the dock area, moving the first pane to the dock area; and
responsive to a direction of the drag input being away from the dock area, making the first pane the current pane.

21. The method of claim 16, further comprising:
determining whether a location of the release meets a maximization threshold;

responsive to the location failing to meet the maximization threshold, moving the first pane to the dock area; and responsive to the location meeting the maximization threshold, making the first pane the current pane.

22. The method of claim 21, wherein determining the location of the release occurs responsive to determining that a velocity of the drag input fails to meet a velocity threshold.

23. A mobile device comprising:
a display;
at least one processor;
memory storing a stack list, the stack list including a list of panes in a maximized state, a pane being a resizable container for displaying active content, a maximized state representing a largest size of a pane, wherein a pane at a top of the stack list is a current pane;
memory storing a dock list, the dock list including a list of panes in a minimized state in a dock area of the display, a minimized state for a pane displaying an active view of a smaller version of content displayed in the maximized state for the pane and the dock area overlaying the current pane; and
memory storing instructions that, when executed by the at least one processor, cause the mobile device to:
display the stack list, wherein the content of the current pane is displayed and the content of remaining panes in the stack list are hidden behind the current pane, display panes in the dock list in a dock area, wherein at most a predetermined number of panes in the dock list are displayed simultaneously and remaining panes in the dock list are off display, and responsive to receiving a long touch input lacking a distance component on a navigation control in the content of the current pane, generate a new pane, the new pane being associated with content for a target location of the navigation control and the new pane being added to the dock list and displayed in the dock area.

24. The mobile device of claim 23, wherein the stack list includes a home page, wherein the home page is not moveable to a draggable state or a minimized state.

25. The mobile device of claim 23, wherein the content for the target location begins loading in the new pane and finishes loading subsequent to being displayed in the dock area.

26. The mobile device of claim 23, wherein the content for the target location continues loading after being scrolled to a new location in the dock area.

27. The mobile device of claim 23, wherein each pane has respective flag indicating whether the pane remains active off display.

28. The mobile device of claim 23, wherein each pane has a scroll offset attribute.

* * * * *